(12) United States Patent
Edwards

(10) Patent No.: US 7,819,453 B2
(45) Date of Patent: Oct. 26, 2010

(54) CARGO LID ASSEMBLY

(75) Inventor: David Michael Edwards, Marysville, OH (US)

(73) Assignee: Honda Motor Company, Ltd., Tokyo (JP)

( * ) Notice: Subject to any disclaimer, the term of this patent is extended or adjusted under 35 U.S.C. 154(b) by 0 days.

(21) Appl. No.: 12/401,774

(22) Filed: Mar. 11, 2009

(65) Prior Publication Data
US 2010/0230985 A1 Sep. 16, 2010

(51) Int. Cl.
*B60P 7/02* (2006.01)

(52) U.S. Cl. ............... 296/37.14; 296/37.7; 296/37.16; 220/810; 224/42.23

(58) Field of Classification Search ............... 296/24.3, 296/37.6, 76, 37.14, 37.1, 39.1, 37.2, 37.3, 296/37.8, 37.16; 224/403, 404, 42.21, 42.12, 224/42.14, 42.23, 42.29, 281, 518, 538; 220/810, 220/845
See application file for complete search history.

(56) References Cited

U.S. PATENT DOCUMENTS

| | | | |
|---|---|---|---|
| 3,893,207 A * | 7/1975 | Rudaitis et al. ......... | 180/69.21 |
| 3,939,620 A | 2/1976 | Bero | |
| 4,748,783 A | 6/1988 | Labelle | |
| 5,074,609 A | 12/1991 | Dear | |
| 5,161,819 A | 11/1992 | Rhodes, Jr. | |
| 5,275,432 A | 1/1994 | Pray et al. | |
| 6,152,513 A | 11/2000 | Karrer | |
| 6,155,625 A * | 12/2000 | Felix ........................ | 296/37.14 |
| 6,247,741 B1 | 6/2001 | Seel et al. | |
| 6,330,734 B1 | 12/2001 | Cho | |
| 6,755,268 B1 | 6/2004 | Polz et al. | |
| 6,786,531 B2 * | 9/2004 | Miyahara et al. ......... | 296/146.1 |
| 6,880,875 B2 | 4/2005 | McClure et al. | |
| 6,883,851 B2 * | 4/2005 | McClure et al. .......... | 296/37.14 |
| 7,374,221 B2 | 5/2008 | McClure et al. | |
| 7,628,440 B2 * | 12/2009 | Bernhardsson et al. ... | 296/37.14 |
| 2003/0067188 A1 | 4/2003 | Go | |
| 2006/0108826 A1* | 5/2006 | McClure et al. ......... | 296/100.07 |
| 2007/0182131 A1 | 8/2007 | Helbig et al. | |
| 2007/0220716 A1 | 9/2007 | Hansen et al. | |

FOREIGN PATENT DOCUMENTS

JP 11207807 A * 8/1999

* cited by examiner

*Primary Examiner*—Patricia L Engle
*Assistant Examiner*—SunSurraye Westbrook
(74) *Attorney, Agent, or Firm*—Ulmer & Berne LLP

(57) ABSTRACT

A cargo lid assembly for a vehicle is provided and includes a cargo lid, at least one lid-engaging member and at least one hinge member that is integral with a respective one of the at least one lid-engaging member and is configured for hinged connection to a body structure of a vehicle. The cargo lid includes an inner member and an outer member that cooperate to define a cavity. The assembly further includes at least one stiffener positioned within the cavity between the inner and outer members of the cargo lid. At least one lid-engaging member is secured to at least one stiffener.

17 Claims, 16 Drawing Sheets

US 7,819,453 B2

CARGO LID ASSEMBLY

TECHNICAL FIELD

The present invention relates generally to vehicles and, more particularly, to a cargo lid assembly for a vehicle.

BACKGROUND

Certain vehicles, such as pickup trucks, can include a cargo bed and a cargo lid hingedly connected to the cargo bed. In the closed position, the cargo lid can be generally flush with the cargo bed floor and can cover a storage space positioned below the floor. During a collision, such as a rear end collision, it can be possible for the cargo lid to become detached from the remainder of the pickup truck, depending upon the impact of the collision and the configuration of the particular pickup truck.

SUMMARY

According to one embodiment, a cargo lid assembly for a vehicle is provided and includes a cargo lid, at least one lid-engaging member, at least one hinge member and at least one stiffener. The cargo lid includes an inner member and an outer member that cooperate to define a cavity, and the cargo lid further includes a core material within the cavity. Each of the at least one hinge member is integral with a respective one of the at least one lid-engaging member and is configured for hinged connection to a body structure of a vehicle. Each of the at least one stiffener is positioned within the cavity between the inner and outer members of the cargo lid, with each of the at least one stiffener being at least partially surrounded by the core material. Each of the at least one lid-engaging member is secured to a respective one of the least one stiffener such that the inner member of the cargo lid is captured therebetween.

According to another embodiment, a cargo lid assembly for a vehicle is provided and includes a cargo lid, a first lid-engaging member, a first hinge member and at least one stiffener. The cargo lid includes an inner member and an outer member that cooperate to define a cavity. The first hinge member is integral with the first lid-engaging member and is configured for hinged connection to a body structure of a vehicle. The at least one stiffener is positioned within the cavity between the inner and outer members of the cargo lid. The inner member of the cargo lid defines a first plurality of apertures extending through the inner member and a second plurality of apertures extending through the inner member. The first lid-engaging member is positioned intermediate the first and second pluralities of apertures and is secured to a respective one of the at least one stiffener such that the inner member of the cargo lid is captured therebetween.

According to another embodiment, a vehicle is provided that includes a body structure and a cargo lid assembly. The cargo lid assembly includes a cargo lid, a first lid-engaging member, a first hinge member and at least one stiffener. The cargo lid includes an inner member and an outer member that cooperate to define a cavity. The first hinge member is integral with the first lid-engaging member and is hingedly connected to the body structure. The at least one stiffener is positioned within the cavity between the inner and outer members of the cargo lid. The inner member of the cargo lid defines a first plurality of apertures extending through the inner member and a second plurality of apertures extending through the inner member. The first lid-engaging member is positioned intermediate the first and second pluralities of apertures and is secured to a respective one of the at least one stiffener such that the inner member of the cargo lid is captured therebetween.

BRIEF DESCRIPTION OF THE DRAWINGS

Various embodiments according to the inventive principles will become better understood with regard to the following description, appended claims and accompanying drawings wherein:

DETAILED DESCRIPTION

Figure 1:
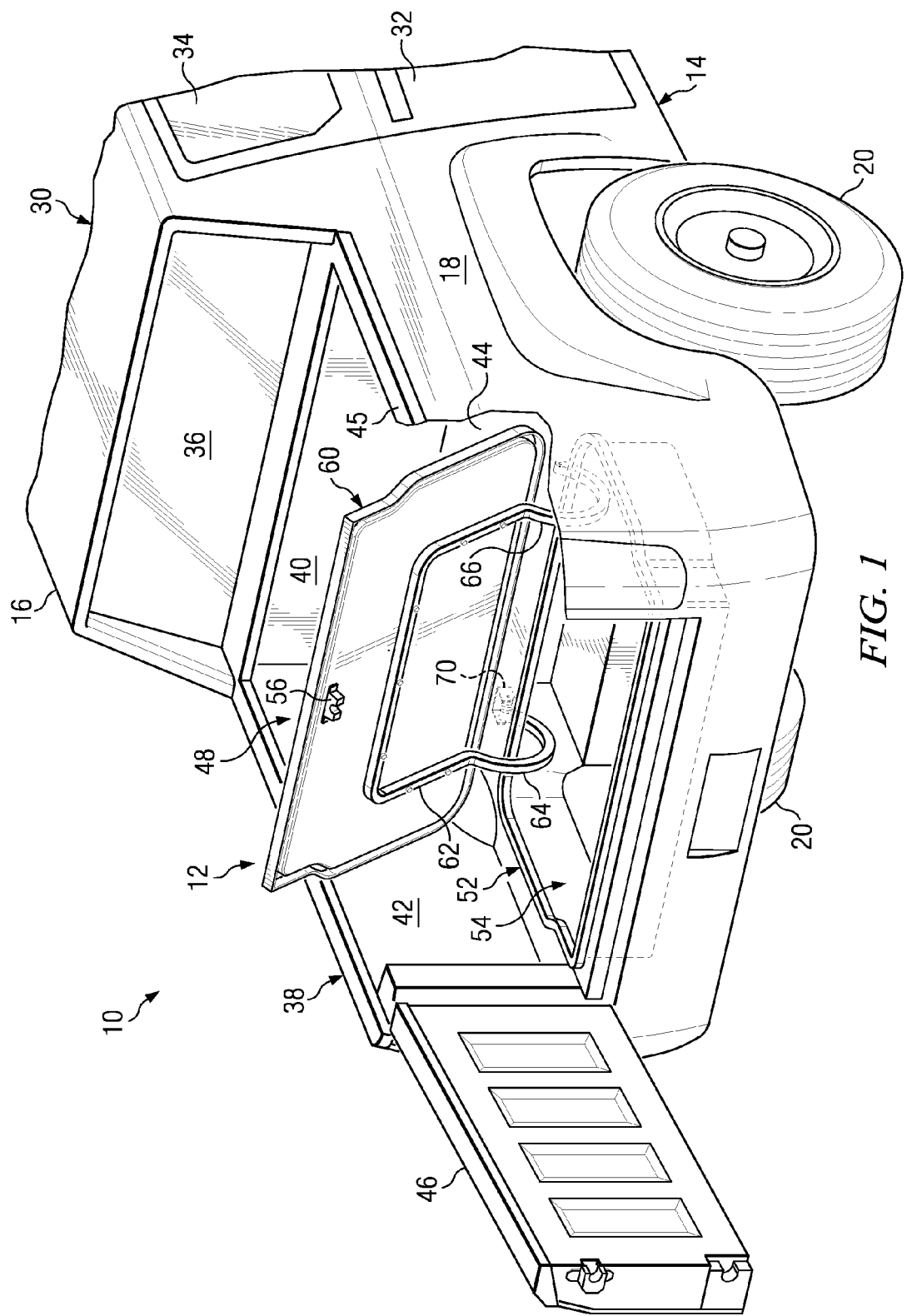
FIG. 1 is a rear perspective view of a portion of a vehicle that includes a cargo lid assembly according to one embodiment, wherein certain hidden portions of the vehicle are shown in dashed lines.

Referring to the drawings, wherein like numbers indicate the same or corresponding elements throughout the views, FIG. 1 illustrates a vehicle 10 that includes a cargo lid assembly 12 according to one embodiment. The cargo lid assembly 12 can be used on a pickup truck such as vehicle 10 shown in FIG. 1. Cargo lid assemblies according to the inventive principles can also be used on pickup trucks having other configurations or other types of vehicles having a hinged cargo lid. Also, it may be appreciated that the inventive principles can be applied to hinged connections of various other components of vehicles, for example the hinged connection of a hood or a door to a body of a truck or automobile.

Vehicle 10 includes a body structure 14 that can include a plurality of panels. For example, the body structure 14 can include a roof panel 16, a pair of rear exterior side panels 18 (one shown), front side panels (not shown), a hood (not shown) and other panels to achieve the desired configuration of vehicle 10. The body structure 14 can include frame members, body members, and/or other components that generally define a shell of the vehicle 10. In one embodiment, the body structure 14 can be a unibody-type structure. In other embodiments, the body structure 14 can include multiple body panels welded to an underlying frame structure.

Vehicle 10 can include a pair of front wheels (not shown) that are rotatably coupled to the body structure 14 and a pair of rear wheels 20 that are also rotatably coupled to the body structure 14. Vehicle 10 also includes a source of motive power (not shown), that can be an internal combustion engine and/or an electric motor, and a drivetrain (not shown) for transferring torque from the source of motive power to the rear wheels 20 and/or the front wheels. Vehicle 10 can also include a cab 30 that can be partially defined by the body structure 14. For example, cab 30 can be defined in part by the roof panel 16. Cab 30 can also include a side door 32, having a window 34, and an opposite side door (not shown) to accommodate the operator of vehicle 10. The cab 30 can also include a rear window 36 and a front windshield (not shown).

Vehicle 10 can also include a bed 38 that can also be defined, at least in part, by the body structure 14. For example, bed 38 can be defined by an interior forward panel 40, a pair of interior side panels 42 (one shown) and a floor 44, each of which are components of the body structure 14. The bed 38 can also include a top frame 45 that extends partially around the perimeter of bed 38 and is associated with panels 40 and 42. Vehicle 30 can also include a tailgate 46 that is hingedly coupled to bed 38. Bed 38, tailgate 46 and cargo lid assembly 12 can cooperate to define a cargo space, indicated generally at 48.

Vehicle 10 can include a sub-structure, or container 52, that can be supported by and extend beneath the floor 44 as shown in FIG. 1. The container 52 defines a storage compartment 54 which can be accessed when the cargo lid assembly 12 is in an open position, as shown in FIG. 1. When the cargo lid assembly 12 is in the closed position (not shown) the storage compartment 54 is closed and any items stored within the storage compartment 54 are protected from the environment. The cargo lid assembly 12 can include a latch member 56 that can engage a mating latch member (not shown) associated with bed 38 to lock the cargo lid assembly 12 in the closed position.

The cargo lid assembly 12 can include a cargo lid 60, a lid-engaging member 62 that can be in contacting engagement with the cargo lid 60, a first hinge member 64, and a second hinge member 66 that is laterally spaced from the first hinge member 64. As shown in FIGS. 1, 2, 4, 5 and 7, the lid-engaging member 62 can extend continuously between the first and second hinge members 64, 66 and can be integral with each of the first and second hinge members 64, 66.

Figure 2:
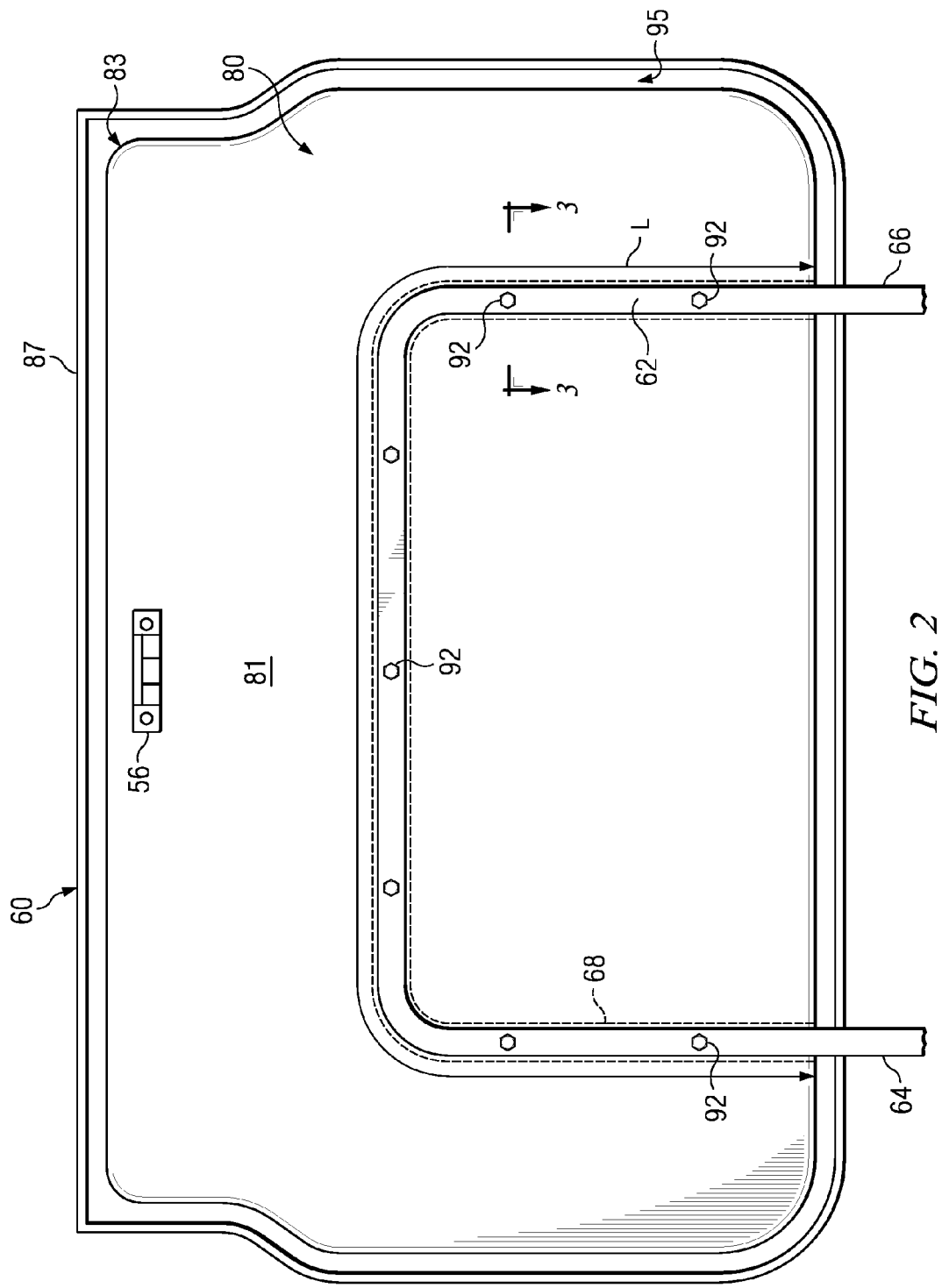
FIG. 2 is a bottom plan view of a portion of the cargo lid assembly shown in FIG. 1, wherein certain hidden portions of the cargo lid assembly are shown in dashed lines.
Figure 3:
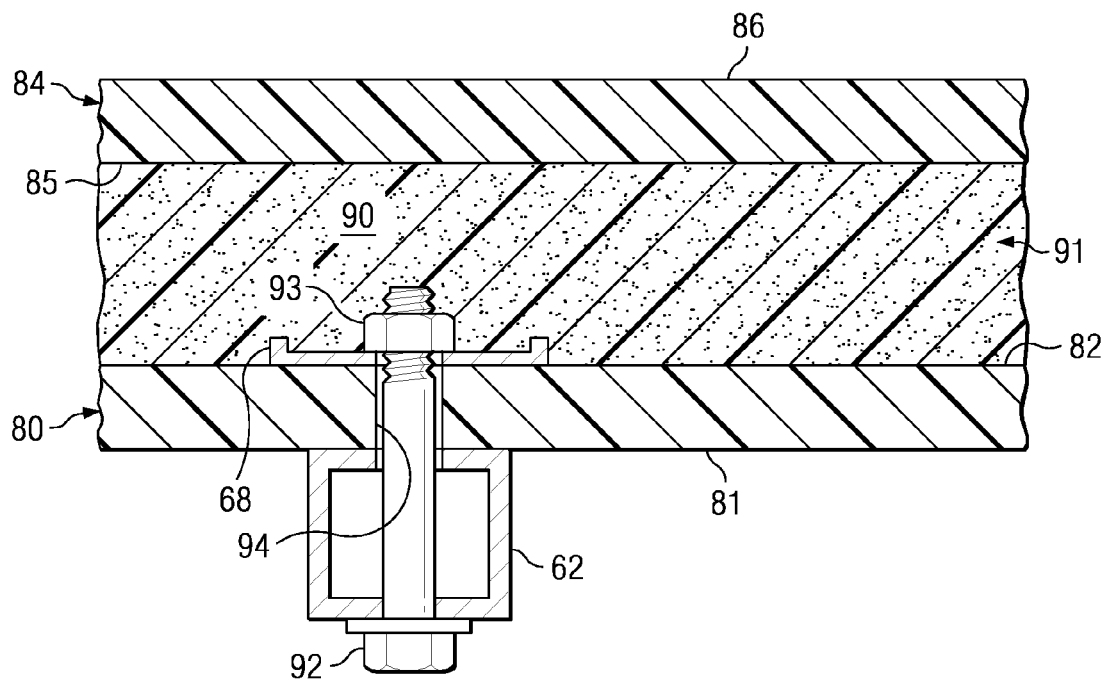
FIG. 3 is a cross-sectional view taken along line 3-3 in FIG. 2.
Figure 4:
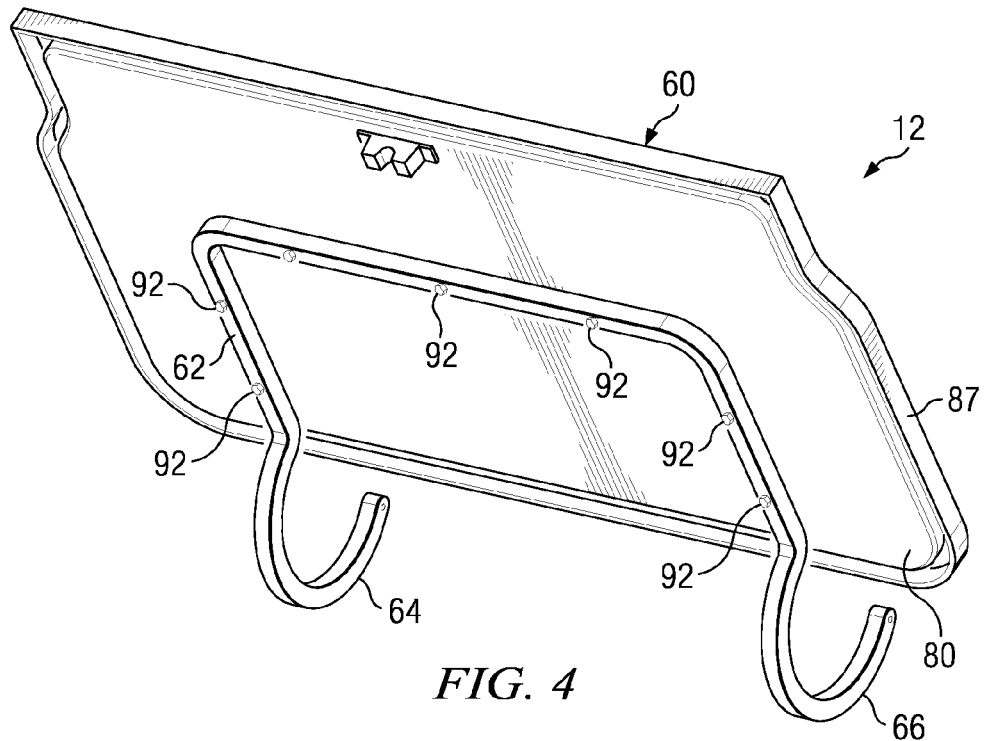
FIG. 4 is a bottom perspective view of the cargo lid assembly shown in FIG. 1.
Figure 5:
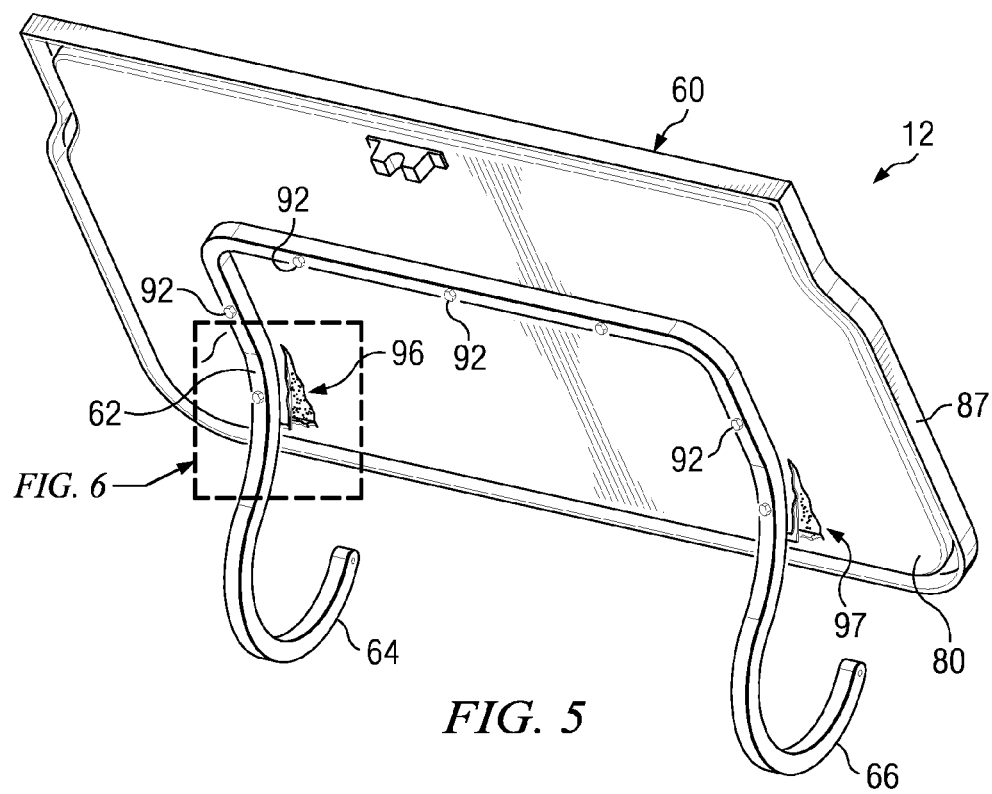
FIG. 5 is a bottom perspective view of the cargo lid assembly shown in FIGS. 1 and 4, but with two local areas of distress illustrated.
Figure 7:
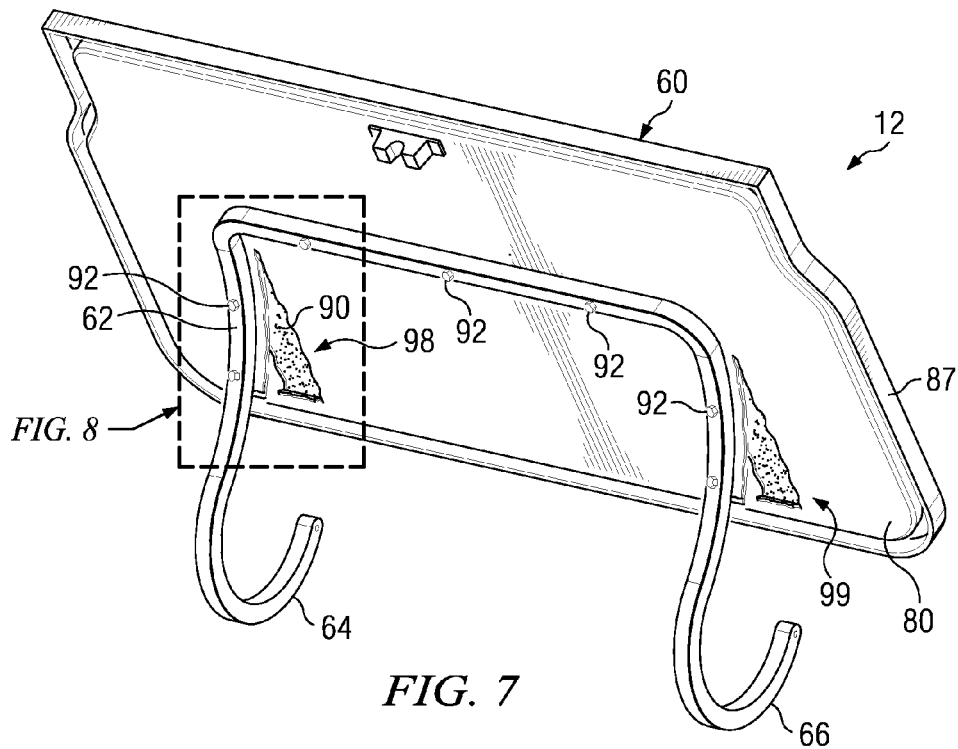
FIG. 7 is a perspective view of the cargo lid assembly shown in FIGS. 1, 4 and 5 but with larger areas of distress illustrated, as compared to those shown in FIG. 5.

As shown in FIG. 2, the lid-engaging member 62 can have a length "L" that extends between the first hinge member 64 and the second hinge member 66. The cargo lid assembly 12 can also include a stiffener 68 positioned within the cargo lid 60 above the lid-engaging member 62. Stiffener 68 can extend along the entire length "L" of the lid-engaging member 62. In other embodiments discussed subsequently, cargo lid assemblies can include multiple stiffeners. The lid-engaging member 62 and the first and second hinge members 64, 66 can have the same transverse cross-sectional shape and can be made as a unitary structure. The lid-engaging member 62 and the first and second hinge members 64, 66 can have a generally square transverse cross-sectional shape as shown in FIG. 3 with respect to the lid-engaging member 62, or any other suitable polygonal or non-polygonal transverse cross-sectional shape. Each of the first and second hinge members 64, 66 can have an arcuate shape between respective proximal and distal ends as shown in FIGS. 4, 5 and 7. As shown in FIG. 2, which is a bottom plan view, the lid-engaging member 62 can be generally U-shaped between the first hinge member 64 and the second hinge member 66 and the stiffener 68 can be generally U-shaped. However, in other embodiments (not shown), hinge members and lid-engaging members can be provided to have other configurations.

Each of the first and second hinge members 64, 66 can be configured for hinged connection to the body structure 14 of vehicle 10. For example, as shown in FIG. 1 with respect to the first hinge member 64, each of the first and second hinge members 64, 66 can be configured to engage a respective female hinge member 70 (one shown) that can be secured to the floor 44 of bed 38. In other embodiments, hinge members can be provided having configurations different than the first and second hinge members 64, 66, that can engage female hinge members having complementary configurations, which can be secured to the floor 44 or a different portion of the body structure 14. The first and second hinge members 64, 66 can cooperate with the lid-engaging member 62, which can be secured to the cargo lid 60 as subsequently described, to hingedly connect the cargo lid 60 to the body structure 14 of the vehicle 10.

As shown in FIG. 3, the cargo lid 60 can include an inner member 80 having an inner surface 81 and an outer surface 82, an outer member 84 having an inner surface 85 and an outer surface 86, and a core material 90 positioned between the outer surface 82 of the inner member 80 and the inner surface 85 of the outer member 84. The outer surface 86 of the outer member 84 can function as a cargo supporting surface and can be generally flush with the floor 44 of bed 38 when the cargo lid 60 is in a closed position (not shown).

The inner member 80 and the outer member 84 can each be made from a variety of materials, such as a sheet molded compound (SMC), which can comprise a fiber-reinforced thermosetting material as known in the art. The inner member 80 and the outer member 84 can alternatively be made from a thermoplastic material or any other suitable polymeric material. Each of the lid-engaging member 62, the first hinge member 64, the second hinge member 66 and the stiffener 68 can be made from a metal, a metal alloy or any other suitable material.

Cargo lid 60 can be formed by molding, which can be a compression molding process. For example, a polymeric material from which the inner member 80 and outer member 84 can be formed can be placed within a mold tool in a layered manner with the stiffener 68 and the core material 90. The mold tool can then be closed and the polymeric material, stiffener 68 and the core material 90 can be compressed and heated, causing the polymeric material to liquefy and flow around the stiffener 68 and the core material 90, and form the inner member 80 and the outer member 84. The inner member 80 and the outer member 84 can cooperate to define a cavity 91, with both the stiffener 68 and the core material 90 positioned within the cavity 91 between the inner member 80 and the outer member 84. As shown in FIG. 3, the core material 90 can fill the cavity 91. During the molding process, the stiffener 68 can be bonded to the inner member 80. The stiffener 68 can include one or more holes (not shown) that can allow the polymeric material to flow through stiffener 68 such that the stiffener 68 is encapsulated by the polymeric material. In one embodiment, stiffener 68 can be embedded in the inner member 80. The core material 90 can comprise any of a variety of materials, e.g., foam, balsa wood, a honeycomb material, or any other suitable material. The core material 90 can act as a spacer to generally maintain a desired spacing between the inner member 80 and the outer member 84. However, the core material 90 might not be provided where the perimeter portion 83 (FIG. 2) of the inner member 80 is secured to the outer member 84. The perimeter portion 83 of the inner member 80 can be bonded to the outer member 84 during the molding process.

Figure 3A:
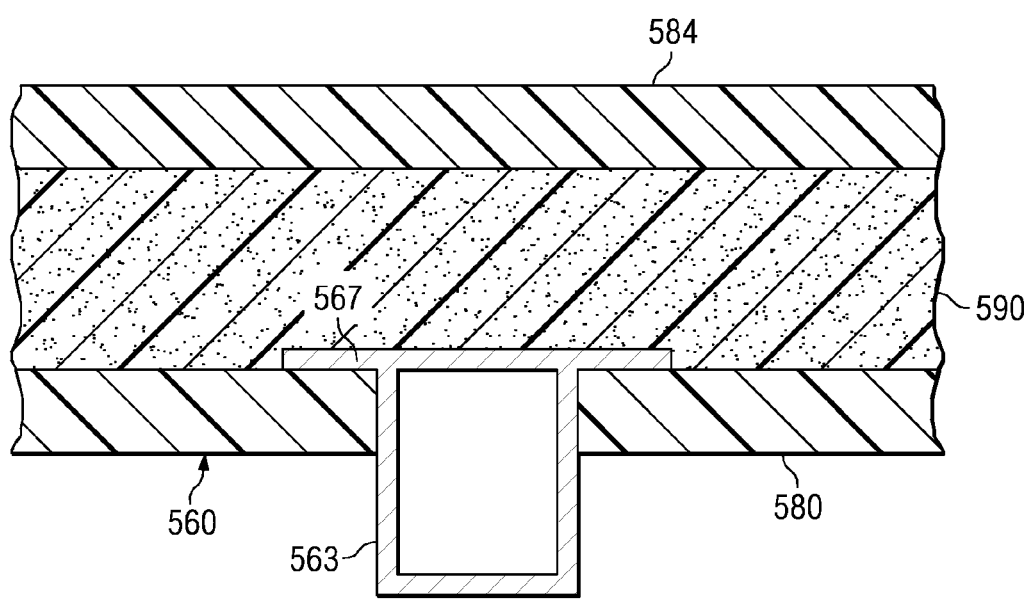
FIG. 3A a cross-sectional view similar to FIG. 3, but illustrating a portion of a cargo lid assembly according to another embodiment.

The lid-engaging member 62 can be positioned in contacting engagement with the inner surface 81 of the inner member 80 and can be secured to stiffener 68. For example, the lid-engaging member 62 can be fastened to the stiffener 68 using a plurality of conventional fasteners such as bolts 92 and nuts 93 (one of each shown in FIG. 3), which captures the inner member 80 of the cargo lid assembly between the lid-engaging member 62 and the stiffener 68. In order to facilitate assembly, the nuts 93 can be secured to stiffener 68, for example by welding, prior to the molding process. Each nut 93 can be aligned with a respective one of a plurality of apertures 94 (one shown in FIG. 3) that extend through the inner member 80 of cargo lid 60, FIG. 3A illustrates a portion of a cargo lid assembly according to another embodiment that includes a cargo lid 560 having an inner member 580, an outer member 584 and a core material 590 positioned between the inner member 580 and the outer member 584, within a cavity defined by the inner and outer members 580 and 584. The cargo lid assembly can also include a lid-engaging member 563 and a stiffener 567. In this embodiment, the lid-engaging member 563 and the stiffener 567 can be made as a unitary structure from a material that can be a metal, a metal alloy or any other suitable material. In this embodiment, fasteners such as bolts 92 and nuts 93 of cargo lid assembly 12 shown in FIG. 3 are not required. As shown in FIG. 3A, the lid-engaging member 563 can extend through the inner member 580 of cargo lid 560, and each of the lid-engaging member 563 and the stiffener 567 can be bonded to the inner member 580. The inner member 580, outer member 584 and core material 590 of cargo lid 560 can be made of any of the materials described previously with respect to the corresponding elements of cargo lid assembly 12, or any other suitable material.

Referring again to FIG. 2, the outer member 84 of cargo lid 60 can include a downwardly extending perimeter flange 87 that can cooperate with the perimeter portion 83 of the inner member 80 to define a channel 95 that can be configured for receiving a weatherproof seal (not shown). The weatherproof seal can be made from a flexible material, for example an elastomeric material.

FIG. 4 illustrates the cargo lid assembly 12 separate from vehicle 10. Cargo lid assembly 12 can be designed so that the cargo lid 60 can remain connected to vehicle 10 even during an impact of vehicle 10, for example during a collision. The cargo lid assembly 12 can be designed so that local tears or ruptures can occur in the inner member 80 of cargo lid 60, as well as corresponding local distortions of the lid-engaging member 62 and stiffener 68. However, the structural integrity of the remaining portions of the cargo lid 60, lid-engaging member 62 and stiffener 68 can be maintained, such that at least a portion of the stiffener 68 can remain positioned within cavity 91 between the inner member 80 and the outer member 84 of the cargo lid 60. The corresponding portion of the inner member 80 of the cargo lid 60 can remain captured between the lid-engaging member 62 and stiffener 68. Accordingly, the cargo lid 60 can remain connected to vehicle 10, even during an impact of maximum expected severity.

Figure 6:
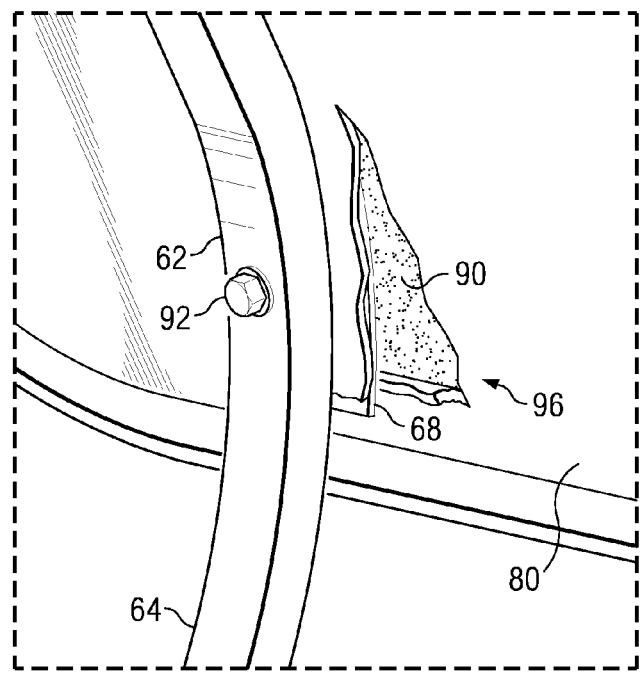
FIG. 6 is an enlarged view of the encircled portion of FIG. 5.

FIG. 5 illustrates areas of distress 96 and 97 in cargo lid 60 as a result of corresponding local tears in the inner member 80 and distortions of the lid-engaging member 62 and the stiffener 68 caused by an impact or collision, such as a rear end collision when vehicle 10 is struck from behind by another vehicle. FIG. 6 is an enlarged view of the area of distress 96 shown in FIG. 5.

Figure 8:
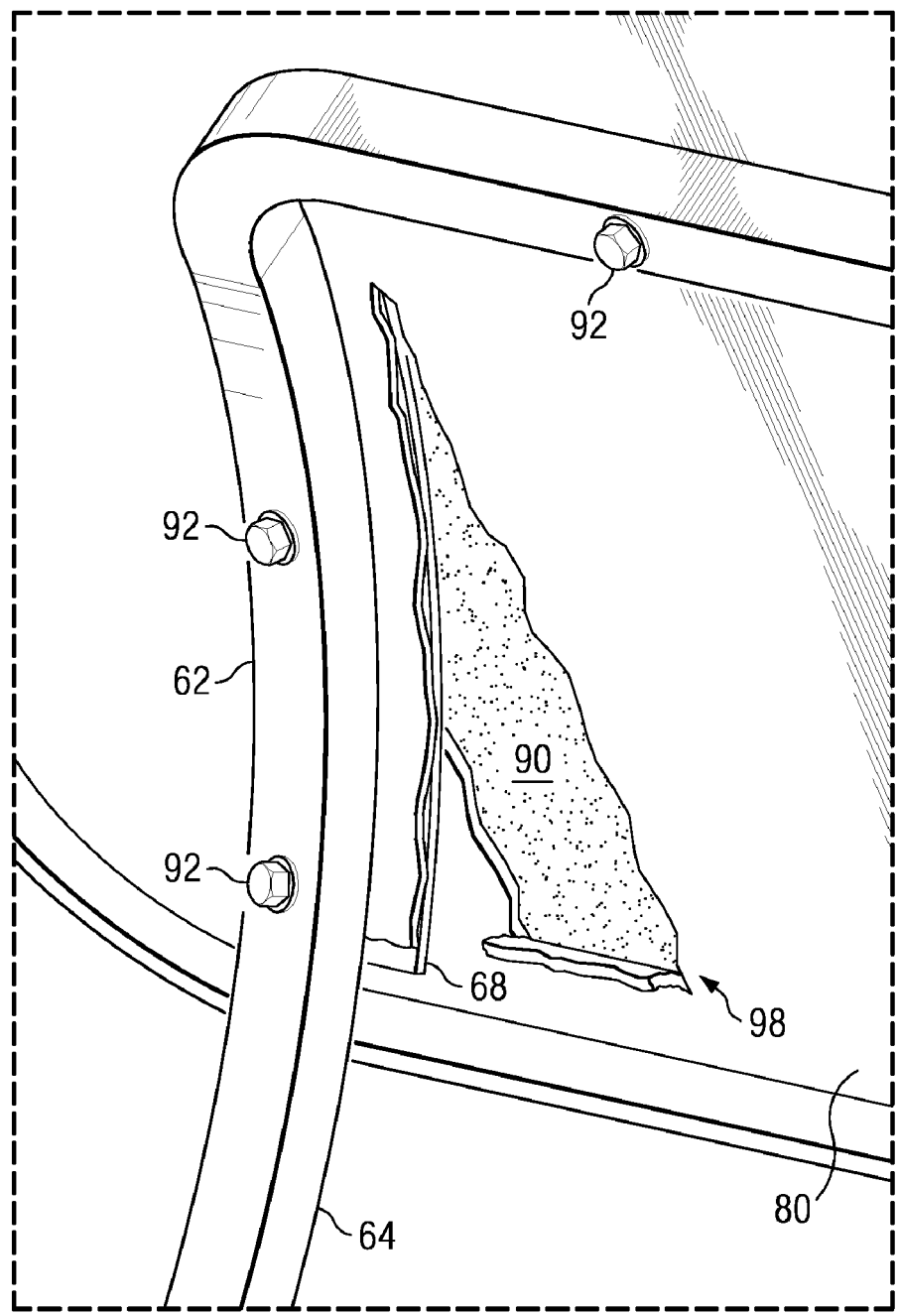
FIG. 8 is an enlarged view of the encircled portion of FIG. 7.
Figure 9:
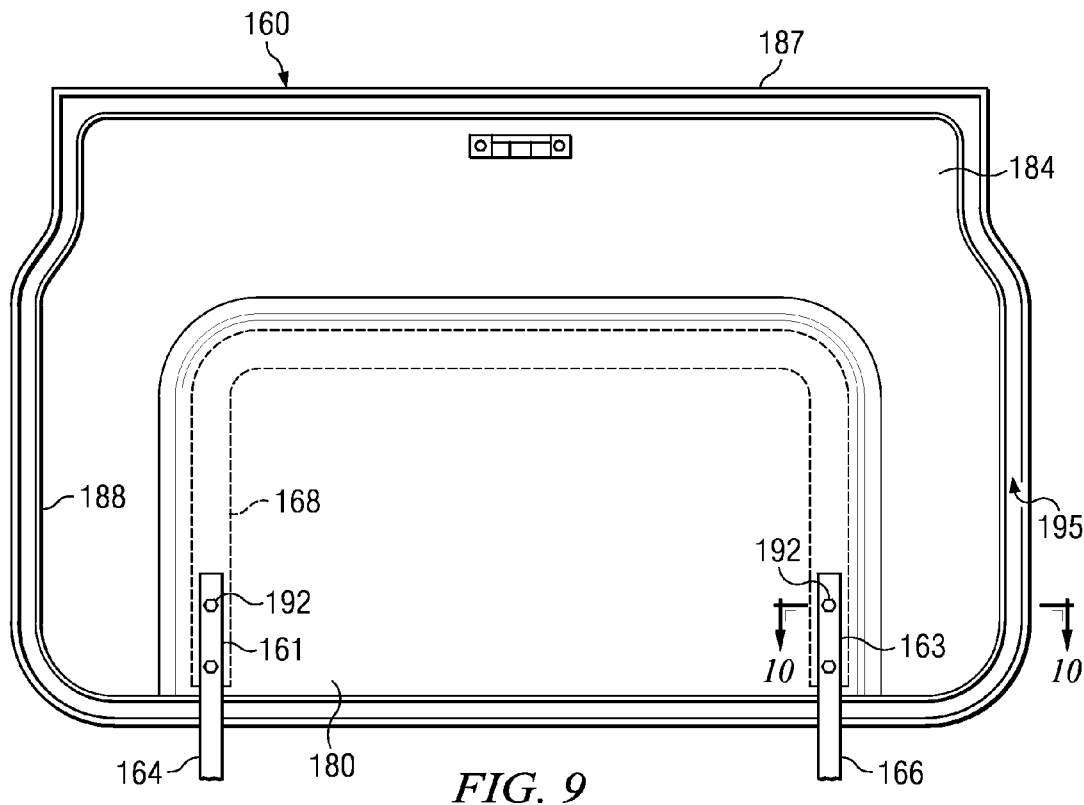
FIG. 9 is a bottom plan view of a portion of a cargo lid assembly according to another embodiment, wherein certain hidden portions of the cargo lid assembly are shown in dashed lines.

FIG. 7 illustrates local areas of distress 98 and 99, and the corresponding local tears in the inner member 80 and the local distortions of lid-engaging member 62 and stiffener 68, which are larger in magnitude than the areas of distress 96 and 97 shown in FIG. 5, which can result from a more severe impact or collision, such as a rear end collision. FIG. 8 is an enlarged view of the area of distress 98 shown in FIG. 7. Distress such as that shown in FIGS. 5-8 can completely destroy cargo lid 60. For example, at each of the areas of distress 96, 97, 98 and 99, cargo lid 60 is torn or ruptured locally to an extent that cargo lid 60 might not be repairable and may therefore be completely destroyed, but cargo lid 60 can remain connected to vehicle 10.

With reference to FIGS. 5-8, the local tears or ruptures in the inner member 80 of cargo lid 60 and the corresponding local distortions of the lid-engaging member 62 and stiffener 68 at the areas of distress 96, 97, 98 and 99 can absorb some of the energy of the impact of vehicle 10. The generally U-shaped lid-engaging member 62, which can be integral with both the first hinge member 64 and the second hinge member 66, and the generally U-shaped stiffener 68, which can be attached to the lid-engaging member 62, can be sized, configured and made from a material having sufficient mechanical strength to provide, in combination with the surface area of the inner member 80 of cargo lid 60 that is captured between the lid-engaging member 62 and stiffener 68, sufficient structural integrity to prevent cargo lid 60 from separating from vehicle 10. More particularly, the energy of an impact of maximum expected severity can be insufficient to distort the lid-engaging member 62 and stiffener 68 to the extent required to cause the portion of the cargo lid 60 captured between the lid-engaging member 62 and stiffener 68 to be torn away from the remainder of the cargo lid 60.

Figure 10:
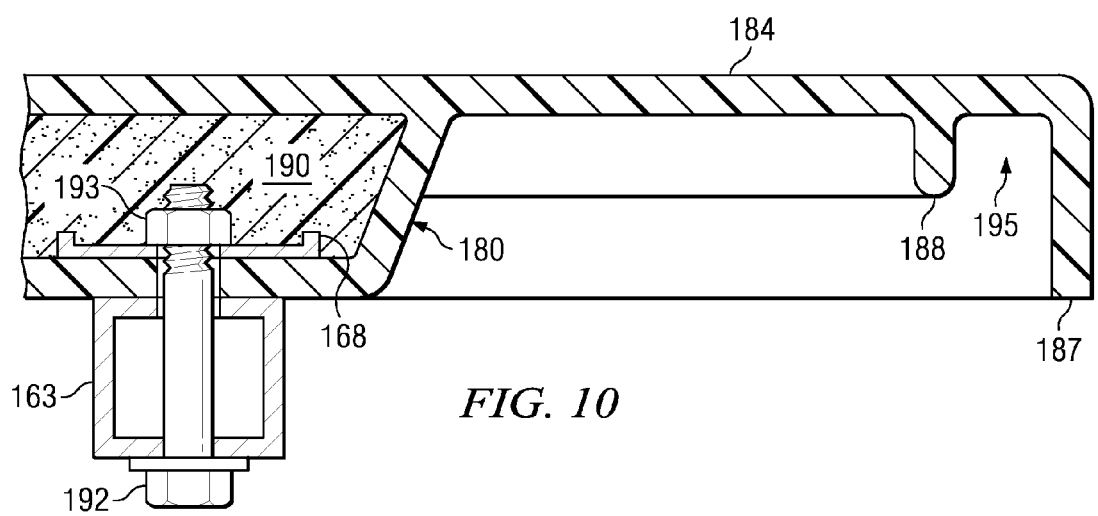
FIG. 10 is a cross-sectional view taken along line 10-10 in FIG. 9.

FIGS. 9-12 illustrate a cargo lid assembly 112 according to another embodiment. The cargo lid assembly 112 can include a cargo lid 160, a first lid-engaging member 161, a second lid-engaging member 163, a first hinge member 164, a second hinge member 166 and a stiffener 168. As shown in FIG. 10, the cargo lid 160 can include an inner member 180, an outer member 184 and a core material 190 disposed within a cavity defined by the inner and outer members 180, 184. The stiffener 168 can be positioned within the cavity defined by the inner and outer members 180 and 184. The following elements of cargo lid assembly 112 can be made of the same materials as the corresponding elements of cargo lid assembly 12, or from any other suitable material: the inner member 180, outer member 184 and core material 190 of cargo lid 160; the first and second lid-engaging members 161, 163; the first and second hinge members 164, 166; and stiffener 168.

Each of the lid-engaging members 161, 163 can be fastened to the stiffener 168, which can extend continuously between the first lid-engaging member 161 and the second lid-engaging member 163, using a plurality of conventional fasteners such as bolts 192 and nuts 193 (one of each shown in FIG. 10). Fastening the lid-engaging members 161, 163 to the stiffener 168 captures the cargo lid 160 between the first lid-engaging member 161 and stiffener 168 and between the second lid-engaging member 163 and stiffener 168. The lid-engaging member 161 can be integral with the hinge member 164, which can be configured to be hingedly connected to a vehicle such as vehicle 10. Similarly, the lid-engaging member 163 can be integral with the hinge member 166, which can also be configured to be hingedly connected to a vehicle such as vehicle 10. The inner member 180 of cargo lid 160 can be bonded to the outer member 184 at a location spaced apart from a downwardly extending perimeter flange 187 of the outer member 184, such that the inner member 180 defines a generally centrally located raised portion of the cargo lid 160. The outer member 184 can also include a downwardly extending flange 188 that can cooperate with the perimeter flange 187 to define a channel 195 that can be configured to receive a weatherproof seal (not shown).

Figure 11:
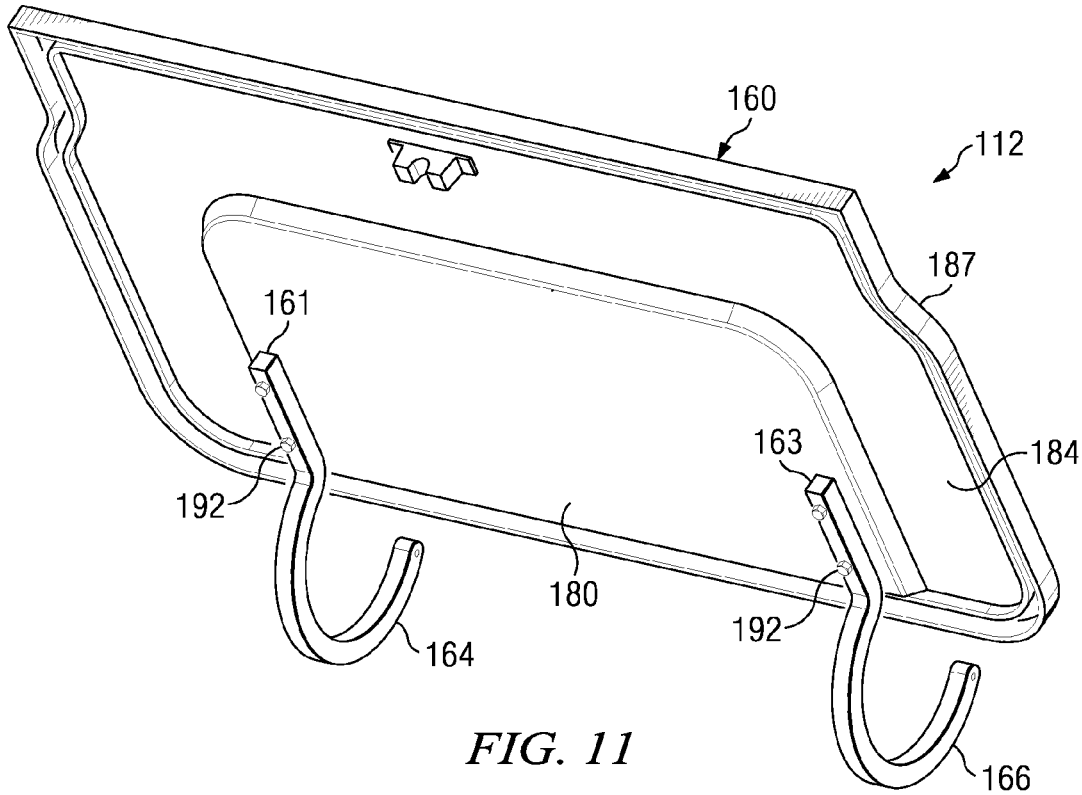
FIG. 11 is a bottom perspective view of the cargo lid assembly shown partially in FIGS. 9 and 10.
Figure 12:
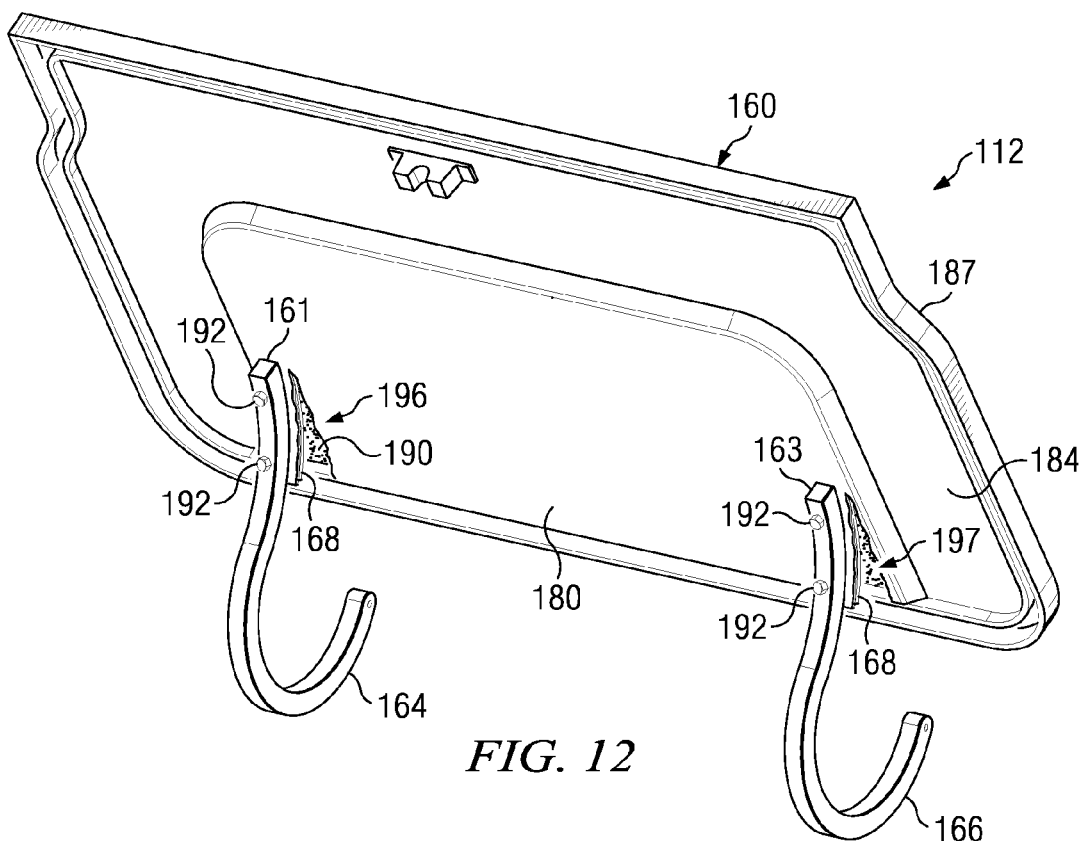
FIG. 12 is a bottom perspective view of the cargo lid assembly shown in FIG. 11, but with two areas of distress illustrated.

FIG. 11 illustrates the cargo lid assembly 112 separate from a vehicle such as vehicle 10. Like cargo lid assembly 12, the cargo lid assembly 112 can be designed so that the cargo lid 160 can remain connected to a vehicle such as vehicle 10 even during an impact of the vehicle, for example during a collision, of maximum expected severity. FIG. 12 illustrates areas of distress 196 and 197 on cargo lid 160 as a result of local tears or ruptures in the inner member 180 of cargo lid 160 and corresponding distortions of the lid-engaging members 161, 163 and the associated portions of the stiffener 168, caused by an impact or collision, such as a rear end collision, when the vehicle to which the cargo lid 160 is hingedly connected is struck from behind by another vehicle. The cargo lid 160 can remain connected to the associated vehicle, even during an impact of maximum expected severity, by virtue of the configuration of cargo lid assembly 112 described above, in much the same manner as that described previously with respect to cargo lid assembly 12.

Figure 13:
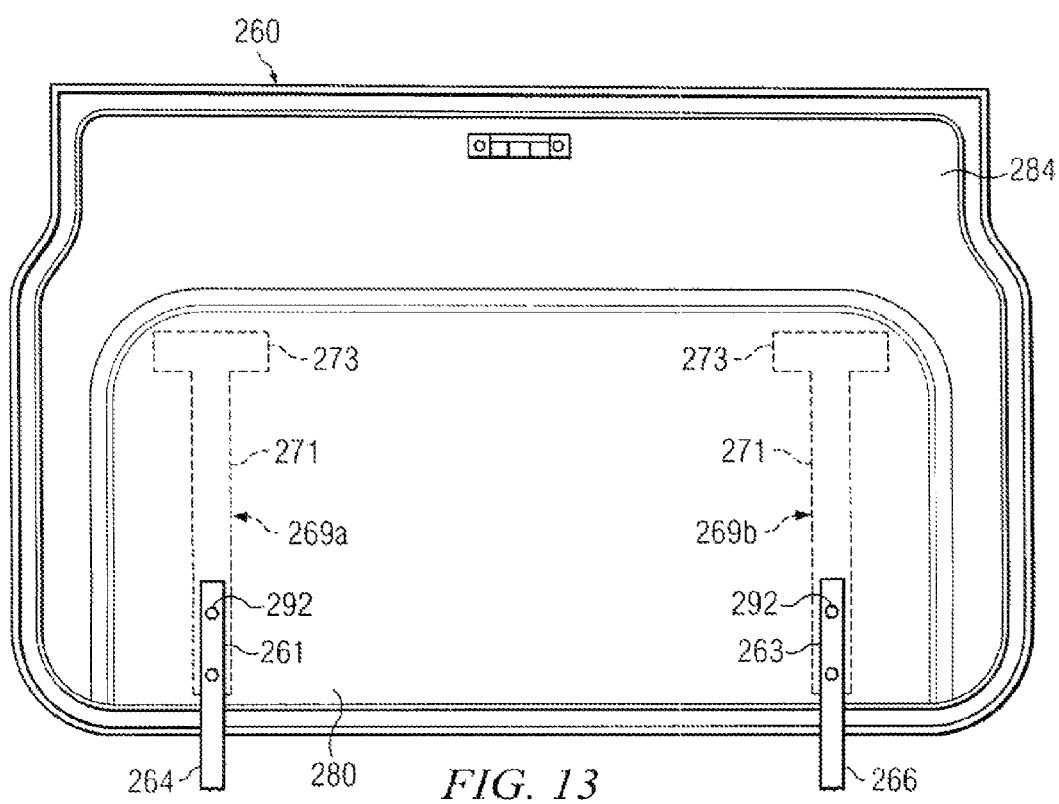
FIG. 13 is a bottom plan view of a portion of a cargo lid assembly according to another embodiment, wherein certain hidden portions of the cargo lid assembly are shown in dashed lines.
Figure 14:
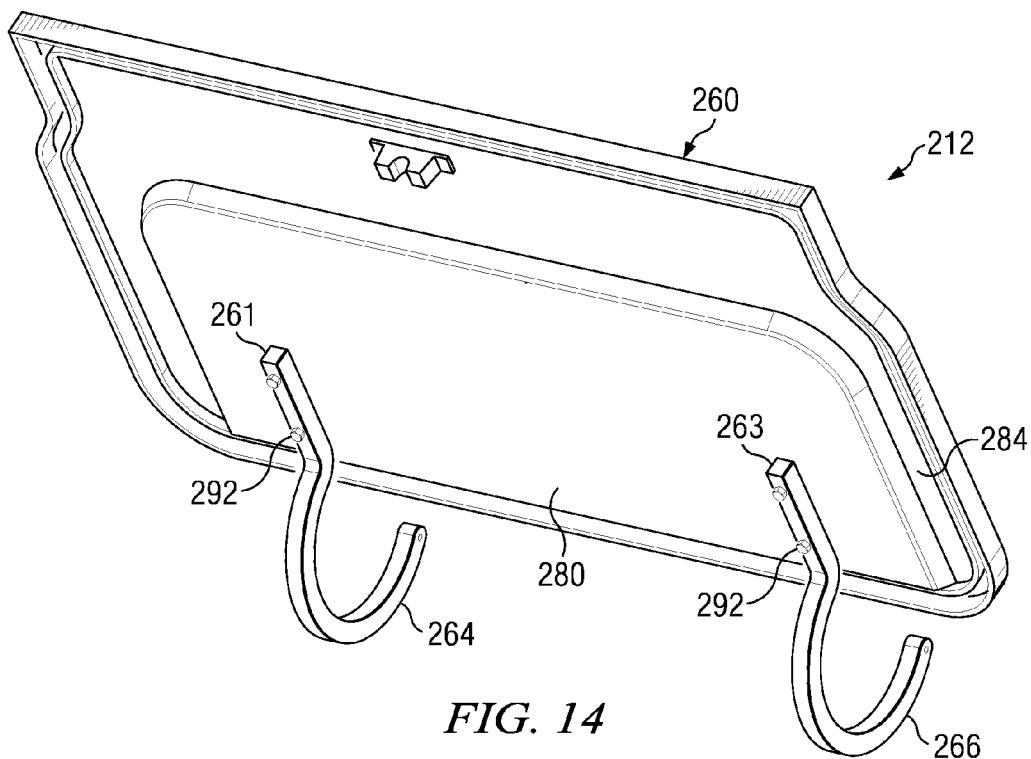
FIG. 14 is a bottom perspective view of the cargo lid assembly shown partially in FIG. 13.
Figure 15:
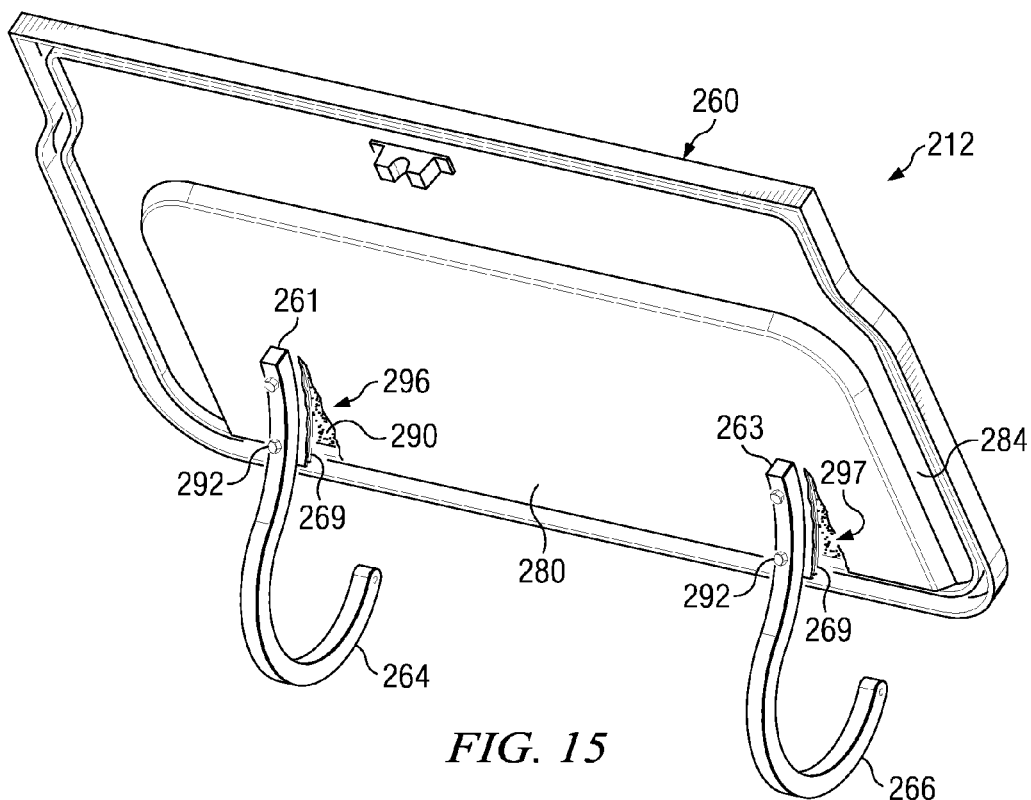
FIG. 15 is a bottom perspective view of the cargo lid assembly shown in FIG. 14, but with two areas of distress illustrated.

FIGS. 13-15 illustrate a cargo lid assembly 212 according to another embodiment. Cargo lid assembly 212 can include a cargo lid 260, a first lid-engaging member 261, a second lid-engaging member 263, a first hinge member 264 and a second hinge member 266. The first hinge member 264 can be integral with the first lid-engaging member 261 and can be configured for hinged connection to a vehicle such as vehicle 10. Similarly, the second hinge member 266 can be integral with the second lid-engaging member 263 and can be configured for hinged connection to a vehicle such as vehicle 10.

The cargo lid 260 can include an inner member 280 and an outer member 284 which can be configured similar to or the same as the inner member 180 and outer member 184, respectively, of cargo lid 160, such that the inner and outer members 280 and 284 define a cavity with a core material 290 (FIG. 15) disposed within the cavity. The cargo lid assembly 212 can include a pair of stiffeners 269 (shown in dashed lines in FIG. 13) that can be positioned in the cavity defined by the inner and outer members 280, 284. The following elements of cargo lid assembly 212 can be made of the same material as the corresponding elements of cargo lid assembly 12, or any other suitable material; inner member 280, outer member 284 and core material 290 of cargo lid 260; the first and second lid-engaging members 261, 263; the first and second hinge members 264, 266; and stiffeners 269.

The lid-engaging member 261 can be fastened to one of the stiffeners 269, with conventional fasteners such as a plurality of bolts 292 and a plurality of nuts (not shown). Similarly, the lid-engaging member 263 can be fastened to the other stiffener 269 with a plurality of bolts 292 and a plurality of nuts (not shown). Fastening each of the lid-engaging members 261 and 263 to a respective stiffener 269, e.g., stiffeners 269a and 269b, respectively, as shown in FIG. 13, captures the inner member 280 of the cargo lid 260 between the lid-engaging member 261 and the respective stiffener 269 and between the lid-engaging member 263 and the respective stiffener 269. As will be appreciated with reference to FIG. 13, each of the stiffeners 269 can be generally T-shaped. Each stiffener 269 can include a first portion 271 that is generally parallel to the respective lid-engaging member 261, 263, and a second portion 273 that can be transverse to the first portion 271. The generally T-shaped configuration of each stiffener 269 can enhance the structural integrity of cargo lid assembly 212.

FIG. 15 illustrates an area of distress 296 caused by a local tear in the inner member 280 of the cargo lid 260 and corresponding distortions of the lid-engaging member 261 and one of the stiffeners 269. FIG. 15 also illustrates an area of distress 297 caused by another local tear in the inner member 280 of the cargo lid 260 and corresponding distortions of the lid-engaging member 263 and the other stiffener 269. The cargo lid 260 can remain connected to the associated vehicle, even during an impact of maximum expected severity, by virtue of the configuration of cargo lid assembly 212 described above, in much the same manner as that described previously with respect to cargo lid assembly 12.

Figure 16:
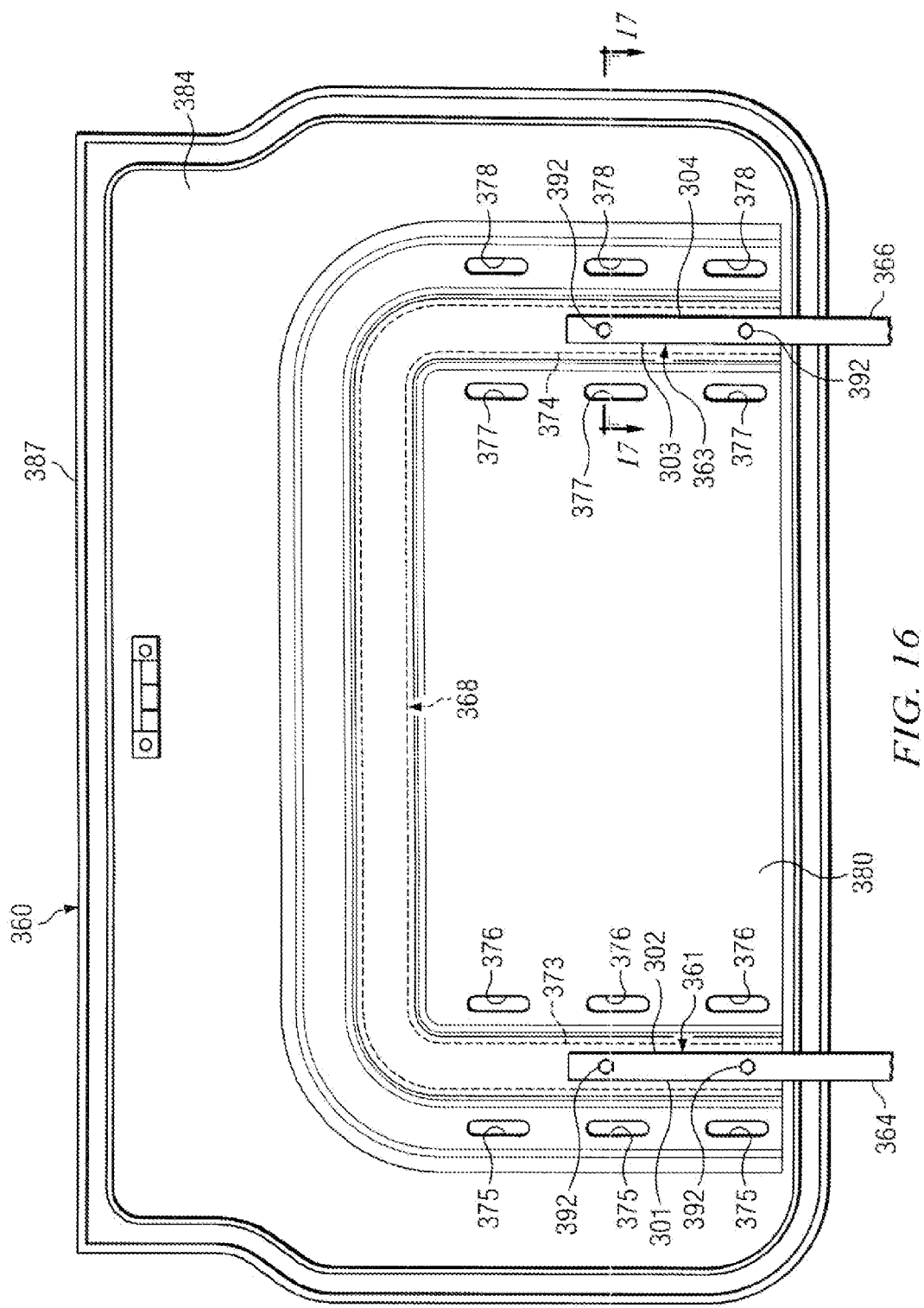
FIG. 16 is a bottom plan view of a portion of a cargo lid assembly according to another embodiment, wherein certain hidden portions of the cargo lid assembly are shown in dashed lines.
Figure 17:
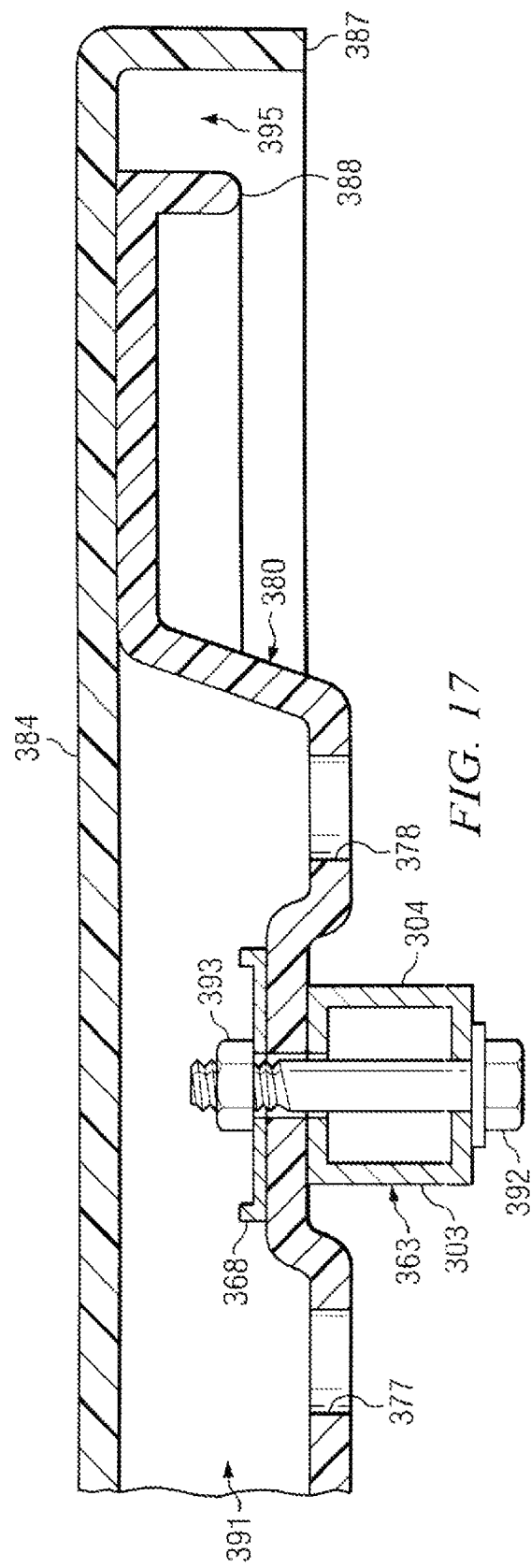
FIG. 17 is a cross-sectional view taken along line 17-17 in FIG. 16.

FIGS. 16-19 illustrate a cargo lid assembly 312 according to another embodiment. The cargo lid assembly 312 can include a cargo lid 360, a first lid-engaging member 361, a second lid-engaging member 363, a first hinge member 364 and a second hinge member 366. The first hinge member 364 can be integral with the first lid-engaging member 361 and can be configured to be hingedly connected to a vehicle, such as vehicle 10. Similarly, the second hinge member 366 can be integral with the second lid-engaging member 363 and can be configured to be hingedly connected to a vehicle such as vehicle 10. With reference to FIG. 17, the cargo lid 360 can include an inner member 380 and an outer member 384 that can cooperate to define a cavity 391. The outer member 384 can include a downwardly extending outer perimeter flange 387 and the inner member 380 can include a downwardly extending outer perimeter flange 388. Flanges 387 and 388 can cooperate to define a channel 395 that can be configured to receive a weatherproof seal 395 (not shown). Unlike cargo lids 60, 160 and 260, cargo lid 360 does not include a core material disposed within the cavity 391.

Cargo lid assembly 312 can further include a stiffener 368, which can be generally U-shaped as shown in dashed line in FIG. 16 and which can be positioned within the cavity 391. With reference to FIGS. 16 and 17, each of the lid-engaging members 361, 363 can be fastened to the stiffener 368 using a plurality of conventional fasteners such as a plurality of bolts 392 and a plurality of nuts 393, which captures the cargo lid 360 between the lid-engaging member 361 and the stiffener 368 and between the lid-engaging member 363 and the stiffener 368. The stiffener 368 can extend continuously between the lid-engaging members 361, 363 as shown in FIG. 16. The following elements of cargo lid assembly 312 can be made from the same material as the corresponding elements of cargo lid assembly 312, or from any other suitable material: the inner member 380 and the outer member 384 of cargo lid 360; the first and second lid-engaging members 361, 363; the first and second hinge members 364, 366; and stiffener 368.

Figure 18:
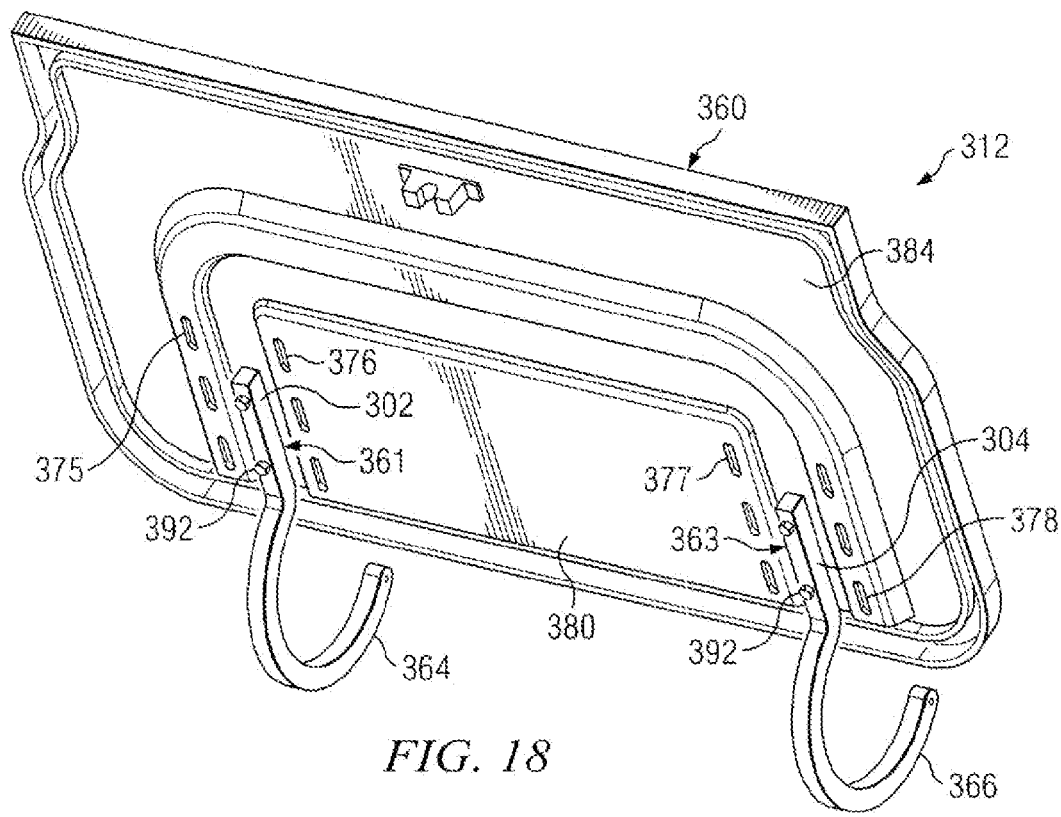
FIG. 18 is a bottom perspective view of the cargo lid assembly shown partially in FIGS. 16 and 17.
Figure 19:
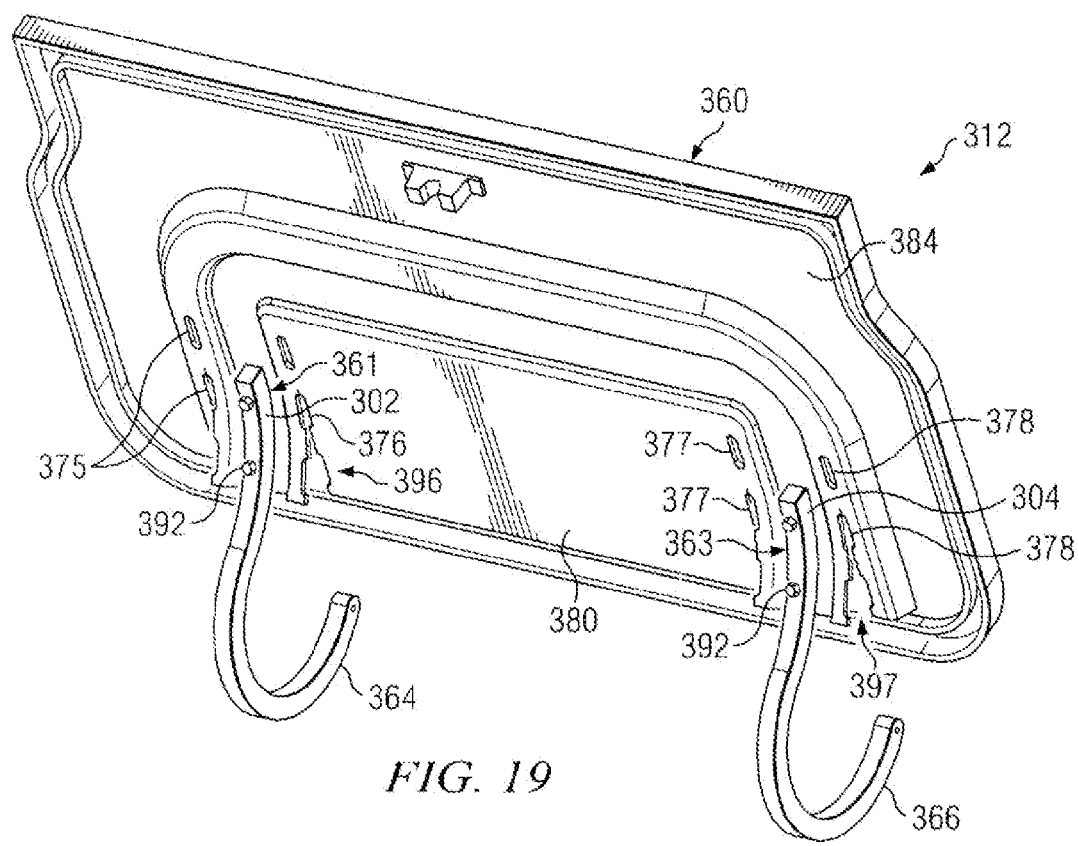
FIG. 19 is a bottom perspective view of the cargo lid assembly shown in FIG. 19, but with two areas of distress illustrated.

The inner member 380 of cargo lid 360 can define a first plurality of apertures 375, a second plurality of apertures 376, a third plurality of apertures 377 and a fourth plurality of apertures 378. Each aperture of each one of the pluralities of apertures 375, 376, 377 and 378 can extend through the inner member 380 as shown in FIG. 17 with respect to one of the apertures 377 and one of the apertures 378. As shown in FIGS. 16, 18 and 19, the first lid-engaging member 361 can be positioned intermediate the first plurality of apertures 375 and the second plurality of apertures 376. At least some of the first plurality of apertures 375 can be adjacent a first side surface 301 of the first lid-engaging member 361, and at least some of the second plurality of apertures 376 can be adjacent a second, opposite side surface 302 of the first lid-engaging member 361, as shown in FIG. 16. Similarly, the second lid-engaging member 363 can be positioned intermediate the third plurality of apertures 377 and the fourth plurality of apertures 378. At least some of the third plurality of apertures 377 can be adjacent a first side surface 303 of the second lid-engaging member 363, and at least some of the fourth plurality of apertures 378 can be adjacent a second, opposite side surface 304 of the second lid-engaging member 363, as shown in FIG. 16. A first portion 373 of the stiffener 368 can be positioned intermediate the first plurality of apertures 375 and the second plurality of apertures 376. A second portion 374 of the stiffener 368 can be positioned intermediate the third plurality of apertures 377 and the fourth plurality of apertures 378.

FIG. 19 illustrates an area of distress 396 corresponding to a local tear in the inner member 380 of cargo lid 360 and corresponding distortions of the lid-engaging member 361 and the first portion 373 of stiffener 368. As shown in FIG. 19, the inner member 380 of cargo lid 360 can be torn along the first and second pluralities of apertures 375, 376. FIG. 19 further illustrates a second area of distress 397 corresponding to another local tear in the inner member 380 of cargo lid 360 and corresponding distortions of the lid-engaging member 363 and the second portion 374 of the stiffener 368. This portion of the cargo lid 360 is shown to be torn along the third and fourth pluralities of apertures 377, 378. It will be appreciated with reference to FIG. 19 that the first, second, third and fourth pluralities of apertures 375, 376, 377 and 378, respectively, can define a predetermined failure mode of the cargo lid assembly 312. It will be further appreciated that the dimensions of each of the apertures 375, 376, 377 and 378, the spacing between adjacent ones of the apertures 375, 376, 377 and 378, and the positioning of the apertures 375, 376, 377 and 378 on cargo lid 360, can affect the predetermined failure mode of the cargo lid assembly 312. The cargo lid 360 can remain connected to the associated vehicle, even during an impact of maximum expected severity, by virtue of the configuration of cargo lid assembly 312 described above, in much the same manner as that described previously with respect to cargo lid assembly 12, except that the apertures 375, 376, 377 and 378 can define a predetermined failure mode of the cargo lid assembly 312 as described above.

FIGS. 20-23 illustrate a cargo lid assembly 412 according to another embodiment. The cargo lid assembly 412 can be similar to the cargo lid assembly 312, except that the single stiffener 368 of cargo lid assembly 312 can be replaced by a pair of generally T-shaped stiffeners 469. The cargo lid assembly 412 can include a cargo lid 460, a first lid-engaging member 461, a second lid-engaging member 463, a first hinge member 464 and a second hinge member 466. The first hinge member 464 can be integral with the first lid-engaging member 461 and can be configured to be hingedly connected to a vehicle such as vehicle 10. Similarly, the second hinge member 466 can be integral with the second lid-engaging member 463 and can be configured to be hingedly connected to a vehicle such as vehicle 10. As will be appreciated with reference to FIG. 21, the cargo lid 460 can include an inner member 480 and an outer member 484 that cooperate to define a cavity 491. Similar to the cargo lid assembly 312, no core material is disposed within the cavity 491. Each of the generally T-shaped stiffeners 469 can be positioned within the cavity 491. The outer member 484 can include a downwardly extending outer perimeter flange 487 and the inner member 480 can include a downwardly extending outer perimeter flange 488. Flanges 487 and 488 can cooperate to define a channel 495 that can be configured to accept a weatherproof seal (not shown). The following elements of cargo lid assembly 412 can be made from the same material as the corresponding elements of cargo lid assembly 12, or from any other suitable material; inner member 480 and outer member 484 of cargo lid 460; the first and second lid-engaging members 461, 463; the first and second hinge members 464, 466; and the stiffeners 469.

Figure 21:
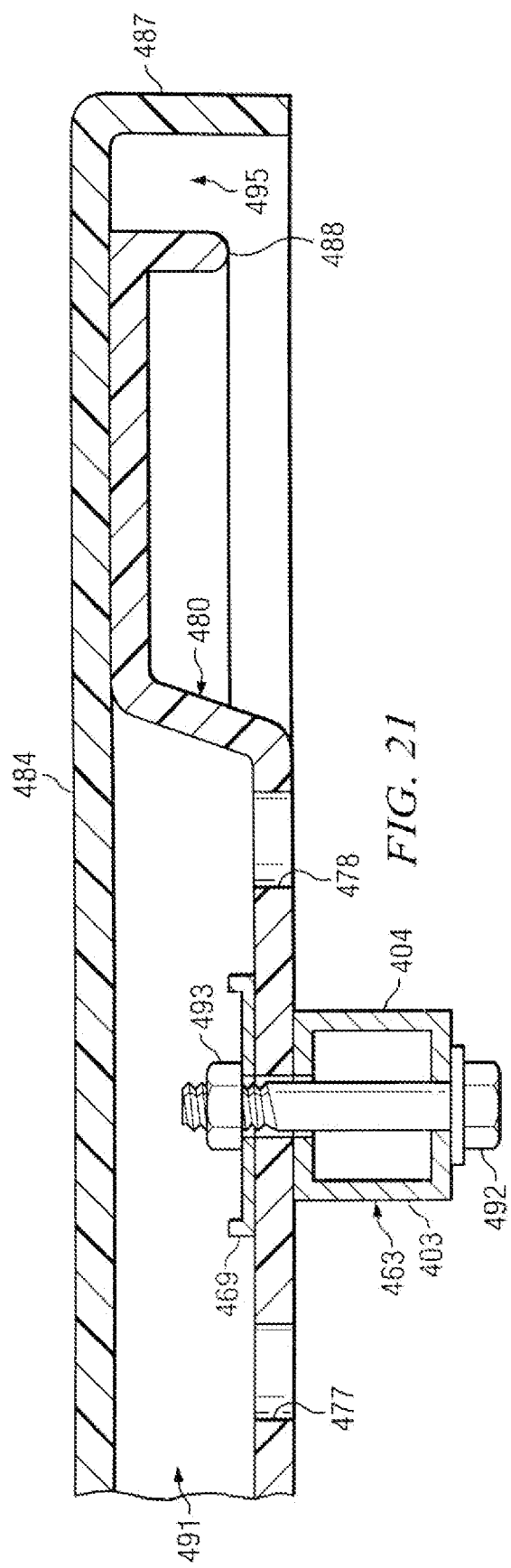
FIG. 21 is a cross-sectional view taken along line 21-21 in FIG. 20.
Figure 22:
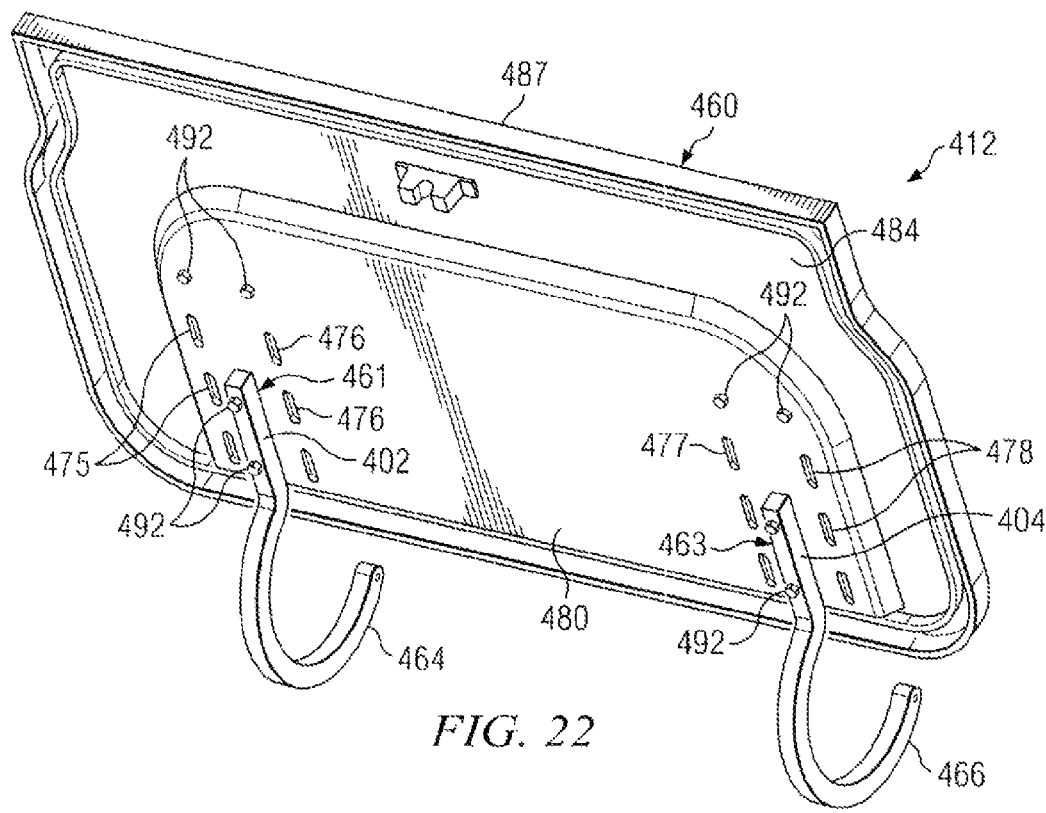
FIG. 22 is a bottom perspective view of the cargo lid assembly shown partially in FIGS. 20 and 21.

The lid-engaging members 461, 463 can be fastened to respective ones of the stiffeners 469 with a plurality of conventional fasteners, such as a plurality of bolts 492 and a plurality of nuts 493 as shown in FIG. 21 with respect to the lid-engaging member 463, one of the stiffeners 469 and one each of the bolts 492 and nuts 493. Fastening the lid-engaging members 461, 463 to the respective ones of the stiffeners 469 captures the cargo lid 460 between the lid-engaging member 461 and the respective stiffener 469 and between the lid-engaging member 463 and the respective stiffener 469.

Figure 20:
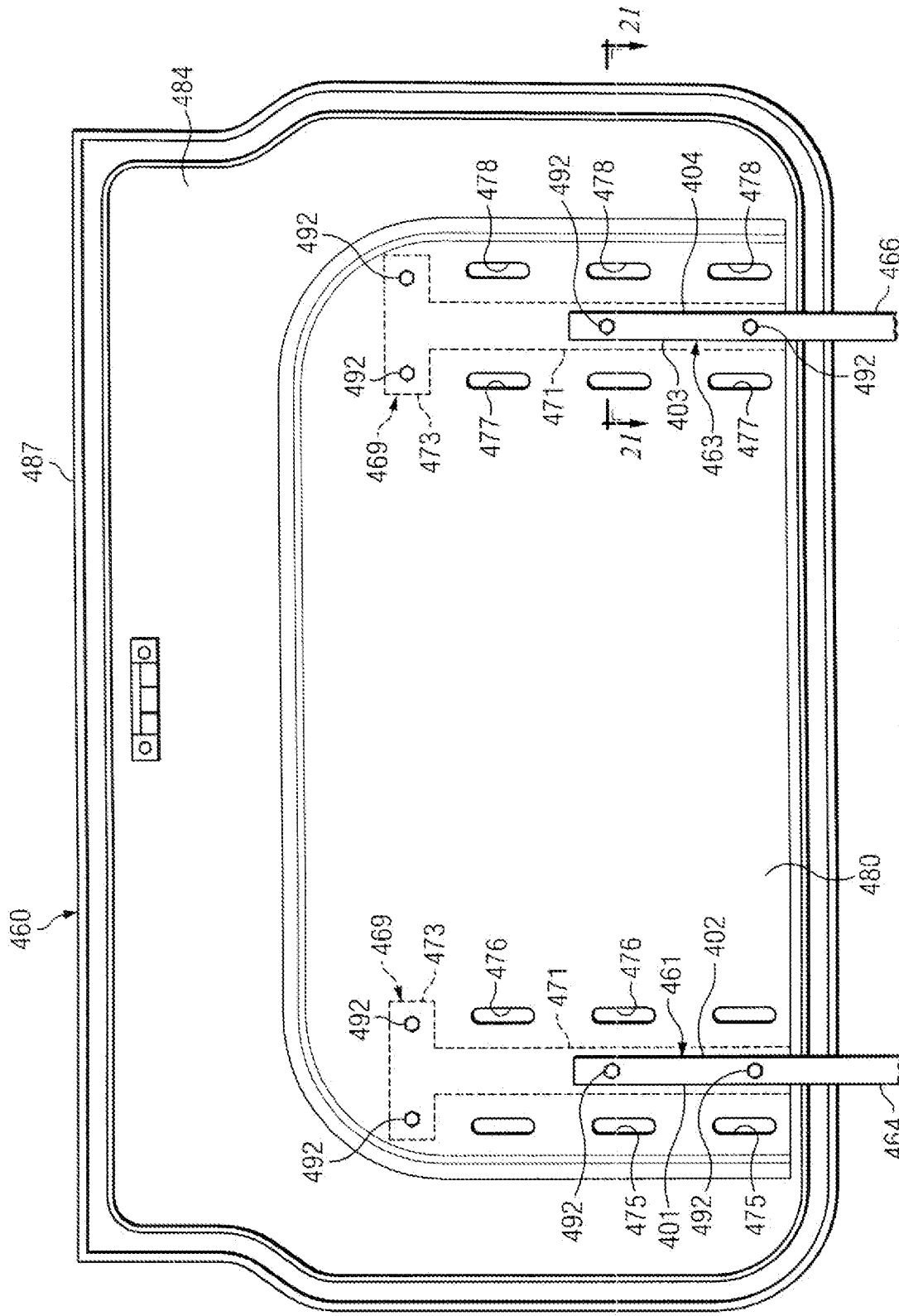
FIG. 20 is a bottom plan view of a portion of a cargo lid assembly according to another embodiment, wherein certain hidden portions of the cargo lid assembly are shown in dashed lines.

Each of the stiffeners 469 can include a first portion 471 that is generally parallel to the respective lid-engaging member 461, 463 and a second portion 473 that can be transverse to the first portion 471 of the respective stiffener 469. As shown in FIG. 20, the cargo lid 460 can be fastened to the transverse portion 473 of each of the respective stiffeners 469 with one or more bolts 492 and mating nuts (not shown). The generally T-shaped configuration of each stiffener 469 can enhance the structural integrity of the cargo lid assembly 412.

The inner member 480 of the cargo lid 460 can define a first plurality of apertures 475, a second plurality of apertures 476, a third plurality of apertures 477 and a fourth plurality of apertures 478. Each aperture of each one of the pluralities of apertures 475, 476, 477 and 478 can extend through the inner member 480 as shown in FIG. 21 with respect to one of the apertures 477 and one of the apertures 478. As will be appreciated with reference to FIGS. 20, 22 and 23, the first lid-engaging member 461 can be positioned intermediate the first plurality of apertures 475 and the second plurality of apertures 476. At least some of the first plurality of apertures 475 can be adjacent a first side surface 401 of the first lid-engaging member 461, and at least some of the second plurality of apertures 476 can be adjacent a second, opposite side surface 402 of the first lid-engaging member 461, as shown in FIG. 20. Similarly, the second lid-engaging member 463 can be positioned intermediate the third plurality of apertures 477 and the fourth plurality of apertures 478. At least some of the third plurality of apertures 477 can be adjacent a first side surface 403 of the second lid-engaging member 463, and at least some of the fourth plurality of apertures 478 can be adjacent a second, opposite side surface 404 of the second lid-engaging member 463, as shown in FIG. 20.

Figure 23:
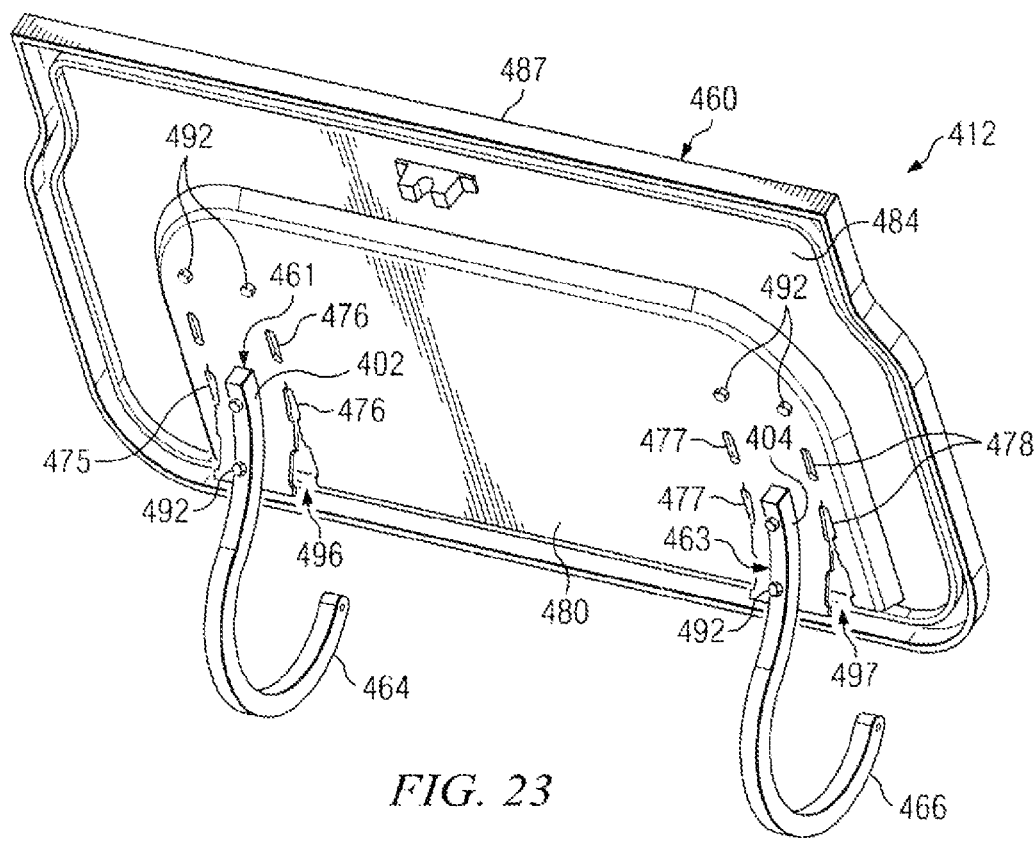
FIG. 23 is a bottom perspective view of the cargo lid assembly shown in FIG. 22, but with two areas of distress illustrated.

FIG. 23 illustrates an area of distress 496 corresponding to a local tear in the inner member 480 of the cargo lid 460, along the apertures 475 and 476, and corresponding distortions of the first lid-engaging member 461 and one of the stiffeners 469. FIG. 23 also illustrates an area of distress 497 corresponding to another local tear in the inner member 480 of the cargo lid 460, along the apertures 477 and 478, and corresponding distortions of the second lid-engaging member 463 and the other stiffener 469. It will be appreciated with reference to FIG. 23 that the first, second, third and fourth pluralities of apertures 475, 476, 477 and 478, respectively, can define a predetermined failure mode of the cargo lid assembly 412. It will be further appreciated that the dimensions of each of the apertures 475, 476, 477 and 478, the spacing between adjacent ones of the apertures 475, 476, 477 and 478, and the positioning of the apertures 475, 476, 477 and 478 on cargo lid 460, can affect the predetermined failure mode of the cargo lid assembly 412. The cargo lid 460 can remain connected to the associated vehicle, even during an impact of maximum expected severity, by virtue of the configuration of cargo lid assembly 412 described above, in much the same manner as that described previously with respect to cargo lid assembly 12, except that the apertures 475, 476, 477 and 478 can define a predetermined failure mode of the cargo lid assembly 412 as described above.

While the inventive principles have been illustrated by the description of various embodiments thereof, and while the embodiments have been described in considerable detail, it is not intended to restrict or in any way limit the scope of the appended claims to such detail. Additional advantages and modifications will be readily apparent to those skilled in the art. The invention in its broader aspects is therefore not limited to the specific details, representative apparatus, methods and examples shown and described. Accordingly, departures may be made from such details without departing from the scope or spirit of the inventive principles.

What is claimed is:

1. A cargo lid assembly for a vehicle, the cargo lid assembly comprising:
   a cargo lid comprising an inner member and an outer member, the inner member and the outer member cooperating to define a cavity, the cargo lid further comprising a core material within the cavity;
   a lid-engaging member;
   a first hinge member and a second hinge member spaced from the first hinge member, each of the first hinge member and the second hinge member being configured for hinged connection to a body structure of a vehicle;
   at least one stiffener, each of the at least one stiffener being positioned within the cavity between the inner and outer members of the cargo lid, each of the at least one stiffener being at least partially surrounded by the core material; wherein
   the lid-engaging member is secured to each of the at least one stiffener; and
   the lid-engaging member extends continuously between the first and second hinge members and is integral with each of the first and second hinge members.

2. The cargo lid assembly of claim 1, wherein:
   the at least one stiffener comprises a single stiffener.

3. The cargo lid assembly of claim 2, wherein:
   the lid-engaging member is fastened to the single stiffener and the inner member of the cargo lid is captured between the lid-engaging member and the single stiffener.

4. The cargo lid assembly of claim 3, wherein:
   the lid-engaging member is generally U-shaped between the first hinge member and the second hinge member and the single stiffener is generally U-shaped.

5. A cargo lid assembly for a vehicle, the cargo lid assembly comprising:
   a cargo lid comprising an inner member and an outer member, the inner member and the outer member cooperating to define a cavity, the cargo lid further comprising a core material within the cavity;
   a first lid-engaging member and a second lid-engaging member spaced from the first lid-engaging member;
   a first hinge member integral with the first lid-engaging member and a second hinge member spaced from the first hinge member and integral with the second lid-engaging member; and
   a pair of generally T-shaped stiffeners spaced from one another; and
   the first lid-engaging member is fastened to a first one of the pair of generally T-shaped stiffeners and the second lid-engaging member is fastened to a second one of the pair of generally T-shaped stiffeners such that the inner member of the cargo lid is captured between the first lid-engaging member and the first one of the pair of generally T-shaped stiffeners and between the second lid-engaging member and the second one of the pair of generally T-shaped stiffeners.

6. The cargo lid assembly of claim 5, wherein:
   each of the inner member and the outer member of the cargo lid comprises a polymeric material.

7. The cargo lid assembly of claim 5, wherein:
   each of the first one of the pair of generally T-shaped stiffeners and the second one of the pair of generally T-shaped stiffeners comprises a first portion and a second portion that is transverse to the first portion;
   the first portion of the first one of the pair of generally T-shaped stiffeners is generally parallel to the first lid-engaging member; and
   the first portion of the second one of the pair of generally T-shaped stiffeners is generally parallel to the second lid-engaging member.

8. The cargo lid assembly of claim 2, wherein:
   each of the at least one stiffener is bonded to the inner member of the cargo lid.

9. A cargo lid assembly for a vehicle, the cargo lid assembly comprising:
   a cargo lid comprising an inner member and an outer member, the inner member and the outer member cooperating to define a cavity;
   a first lid-engaging member comprising a first side surface and a second, opposite side surface;
   a first hinge member integral with the first lid-engaging member, the first hinge member being configured for hinged connection to a body structure of a vehicle;
   at least one stiffener positioned within the cavity between the inner and outer members of the cargo lid; wherein the inner member of the cargo lid defines a first plurality of apertures extending through the inner member and a second plurality of apertures extending through the inner member;
the first lid-engaging member is positioned intermediate the first and second pluralities of apertures;
at least some of the first plurality of apertures are adjacent the first side surface of the first lid-engaging member and at least some of the second plurality of apertures are adjacent the second, opposite side surface of the first lid-engaging member; and
the first lid-engaging member is fastened to a respective one of the at least one stiffener such that the inner member of the cargo lid is captured therebetween.

10. The cargo lid assembly of claim 9, further comprising:
a second lid-engaging member spaced from the first lid-engaging member, the second lid-engaging member comprising a first side surface and a second, opposite side surface;
a second hinge member integral with the second lid-engaging member and configured for hinged connection to a body structure of a vehicle; wherein
the inner member of the cargo lid defines a third plurality of apertures extending through the inner member and a fourth plurality of apertures extending through the inner member; and
the second lid-engaging member is positioned intermediate the third and fourth pluralities of apertures;
at least some of the third plurality of apertures are adjacent the first side surface of the second lid-engaging member and at least some of the fourth plurality of apertures are adjacent the second, opposite side surface of the second lid-engaging member; and
the second lid-engaging member is fastened to a respective one of the at least one stiffener such that the inner member of the cargo lid is captured therebetween.

11. The cargo lid assembly of claim 10, wherein:
the at least one stiffener comprises a single stiffener, a first portion of the single stiffener being positioned intermediate the first and second pluralities of apertures, a second portion of the single stiffener being positioned intermediate the third and fourth pluralities of apertures; and
the first lid-engaging member is fastened to the first portion of the single stiffener and the second lid-engaging member is fastened to the second portion of the single stiffener.

12. The cargo lid assembly of claim 10, wherein:
the at least one stiffener comprises a pair of stiffeners;
a first one of the pair of stiffeners is positioned intermediate the first and second pluralities of apertures;
a second one of the pair of stiffeners is positioned intermediate the third and fourth pluralities of apertures; and
the first lid-engaging member is fastened to the first one of the pair of stiffeners and the second lid-engaging member is fastened to the second one of the pair of stiffeners.

13. The cargo lid assembly of claim 12, wherein:
each of the first one of the pair of stiffeners and the second one of the pair of stiffeners is generally T-shaped and comprises a first portion and a second portion that is transverse to the first portion;
the first portion of the first one of the pair of generally T-shaped stiffeners is generally parallel to the first lid-engaging member; and
the first portion of the second one of the pair of generally T-shaped stiffeners is generally parallel to the second lid-engaging member.

14. The cargo lid assembly of claim 10, wherein;
each of the inner member and the outer member of the cargo lid comprises a polymeric material.

15. A vehicle comprising:
a body structure; and
a cargo lid assembly; wherein
the cargo lid assembly comprises a cargo lid, a first lid-engaging member, a first hinge member and at least one stiffener; wherein
the cargo lid comprises an inner member and an outer member, the inner member and the outer member cooperating to define a cavity;
the first lid-engaging member comprises a first side surface and a second, opposite side surface;
the first hinge member is integral with the first lid-engaging member and is hingedly connected to the body structure;
the at least one stiffener is positioned within the cavity between the inner and outer members of the cargo lid;
the inner member of the cargo lid defines a first plurality of apertures extending through the inner member and a second plurality of apertures extending through the inner member;
the first lid-engaging member is positioned intermediate the first and second pluralities of apertures;
at least some of the first plurality of apertures are adjacent the first side surface of the first lid-engaging member and at least some of the second plurality of apertures are adjacent the second, opposite side surface of the first lid-engaging member; and
the first lid-engaging member is fastened to a respective one of the at least one stiffener such that the inner member of the cargo lid is captured therebetween.

16. The vehicle of claim 15, wherein the cargo lid assembly further comprises:
a second lid-engaging member spaced from the first lid-engaging member the second lid-engaging member comprising a first side surface and a second side surface; and
a second hinge member integral with the second lid-engaging member and hingedly connected to the body structure; wherein
the inner member of the cargo lid defines a third plurality of apertures extending through the inner member and a fourth plurality of apertures extending through the inner member;
the second lid engaging member is positioned intermediate the third and fourth pluralities of apertures;
at least some of the third plurality of apertures are adjacent the first side surface of the second lid-engaging member and at least some of the fourth plurality of apertures are adjacent the second, opposite side surface of the second lid-engaging member; and
the second lid-engaging member is fastened to a respective one of the at least one stiffener such that the inner member of the cargo lid is captured therebetween.

17. The vehicle of claim 16, further comprising:
a cab and a bed, each of the cab and the bed being defined at least in part by the body structure of the vehicle; wherein
the bed comprises a floor;
the cargo lid is hingedly connected to the body structure at a position below the floor of the bed; and
the vehicle is a pickup truck.

* * * * *

UNITED STATES PATENT AND TRADEMARK OFFICE
CERTIFICATE OF CORRECTION

| | | |
|---|---|---|
| PATENT NO. | : 7,819,453 B2 | Page 1 of 1 |
| APPLICATION NO. | : 12/401774 | |
| DATED | : October 26, 2010 | |
| INVENTOR(S) | : David Michael Edwards | |

It is certified that error appears in the above-identified patent and that said Letters Patent is hereby corrected as shown below:

Claim 16, Column 14, line 37, replace "member the" with -- member, the --;

Claim 16, Column 14, line 47, replace "lid engaging" with -- lid-engaging --.

Signed and Sealed this
First Day of March, 2011

David J. Kappos
*Director of the United States Patent and Trademark Office*